(12) United States Patent
Doke et al.

(10) Patent No.: US 6,276,920 B1
(45) Date of Patent: Aug. 21, 2001

(54) MOLD ASSEMBLY FOR LENS BLANK, HAVING MOLD CAVITY AND MATERIAL RESERVOIR DEFINED BY PRESS-FITTING ENGAGEMENT OF UPPER AND LOWER MOLDS WITH INTERMEDIATE SLEEVE

(75) Inventors: Atsuhiro Doke, Kasugai; Seiichi Ichikawa, Kakamigahara, both of (JP)

(73) Assignee: Menicon Co., Ltd., Nagoya-Shi (JP)

( * ) Notice: Subject to any disclaimer, the term of this patent is extended or adjusted under 35 U.S.C. 154(b) by 0 days.

(21) Appl. No.: 09/366,793

(22) Filed: Aug. 4, 1999

(30) Foreign Application Priority Data

Aug. 11, 1998 (JP) .................................................. 10-226903

(51) Int. Cl.$^7$ ...................................................... B29D 11/00
(52) U.S. Cl. ........................ 425/412; 425/416; 425/423; 425/808; 264/1.32; 264/318
(58) Field of Search ..................................... 425/412, 808, 425/195, 416, 420, 423, DIG. 58, 812; 264/2.2, 2.7, 1.32, 318; 249/117, 160, 165, 166, 168, 141

(56) References Cited

U.S. PATENT DOCUMENTS

| | | | | |
|---|---|---|---|---|
| 3,278,285 | * | 10/1966 | Pickering | 425/808 |
| 4,085,919 | * | 4/1978 | Sullivan | 249/134 |
| 4,113,224 | * | 9/1978 | Clark et al. | 425/808 |
| 4,209,289 | * | 6/1980 | Newcomb et al. | 425/412 |
| 4,211,384 | * | 7/1980 | Bourset et al. | 425/808 |
| 4,865,779 | * | 9/1989 | Ihn et al. | 425/808 |
| 5,137,441 | | 8/1992 | Fogarty | 425/412 |
| 5,160,749 | * | 11/1992 | Forgarty | 425/412 |
| 5,972,251 | * | 10/1999 | Shannon | 425/412 |
| 6,071,111 | * | 6/2000 | Doke et al. | 425/412 |

FOREIGN PATENT DOCUMENTS

| | | |
|---|---|---|
| 3-81385 | 4/1991 | (JP) . |
| 7-90241 | 4/1995 | (JP) . |
| 7-80118 | 8/1995 | (JP) . |

* cited by examiner

Primary Examiner—Nam Nguyen
Assistant Examiner—Thu Khan T. Nguyen
(74) Attorney, Agent, or Firm—Burr & Brown

(57) ABSTRACT

Mold assembly for forming a lens blank for an ophthalmic lens, wherein upper and lower tapered inner surfaces of intermediate sleeve are adapted to be held in press-fitting engagement with respective outer surfaces of upper and lower molds, to effect fluid-tight connection of the upper and lower molds with the intermediate sleeve, with the upper mold being held in abutting contact with a shoulder of the intermediate sleeve, and with stopper surfaces of the intermediate and lower molds being held in abutting contact with each other to determine a relative axial position therebetween, such that a mold cavity to be filled with a liquid monomer composition is defined by the upper and lower molds and the intermediate sleeve, while a liquid reservoir for storing an excess amount of the monomer composition which has been discharged from the mold cavity is defined by the upper mold and the intermediate mold.

21 Claims, 11 Drawing Sheets

MOLD ASSEMBLY FOR LENS BLANK, HAVING MOLD CAVITY AND MATERIAL RESERVOIR DEFINED BY PRESS-FITTING ENGAGEMENT OF UPPER AND LOWER MOLDS WITH INTERMEDIATE SLEEVE

BACKGROUND OF THE INVENTION

1. Field of the Invention

The present invention relates in general to a mold assembly for forming a lens blank, and more particularly to a mold assembly for forming a lens blank for an ophthalmic lens such as a contact lens and an intraocular lens, such that the lens blank has desired configuration and dimensions.

2. Discussion of the Related Art

A known method of manufacturing an ophthalmic lens such as a contact lens includes a molding process for forming a lens blank using a mold assembly, and a cutting or machining process for cutting the lens blank into the desired ophthalmic lens. The mold assembly includes an upper mold and a lower mold which cooperate to define a fluid-tightly enclosed mold cavity. In the molding process, a liquid monomer composition filling the mold cavity is polymerized into the lens blank. In the cutting process, the thus formed lens blank is cut on its inner and outer surfaces, to produce the desired contact lens or other ophthalmic lens which has an inner or back surface for contact with the cornea of an eye, and an outer or front surface opposite to the inner surface.

JP-A-4-290706 (U.S. Pat. No. 5,137,441) discloses an example of a mold assembly used in a molding process as described above. This mold assembly consists of an upper mold, a lower mold, and a generally cylindrical intermediate sleeve which removably connect the inner and outer molds. The intermediate sleeve cooperates with the upper mold to define a liquid reservoir for storing an excess amount of the liquid monomer composition which has been discharged from a mold cavity upon closing of the mold assembly. The mold assembly is further adapted to permit a flow of the liquid monomer composition from the liquid reservoir into the mold cavity in the molding process, when a mass of the liquid monomer composition in the mold cavity shrinks during polymerization of the composition, so that a shortage in volume of the liquid monomer composition in the mold cavity is compensated for by a volume of the composition which has been supplied from the liquid reservoir into the mold cavity. Thus, the mold assembly is constructed to prevent a conventionally experienced problem which would otherwise take place due to shrinkage of the liquid monomer composition during polymerization thereof in the mold cavity.

The mold assembly disclosed in the above-identified publication is constructed to be assembled by moving the upper mold into the intermediate sleeve in the axial direction such that the outer circumferential surface of the upper mold is in sliding contact with the inner circumferential surface of the intermediate sleeve. However, the upper mold and the intermediate sleeve do not have an axial stopper for determining an axial position of the upper mold relative to the intermediate sleeve, namely, a relative position between the upper mold and the lower mold which is positioned in a lower portion of the intermediate sleeve. Accordingly, it is difficult to accurately establish the predetermined relative axial position of the upper and lower molds.

The relative axial position of the upper and lower molds determines an axial dimension of the mold cavity defined between the upper and lower molds in the mold assembly in the closed state. Therefore, it is difficult to maintain the axial dimension of the mold cavity at a predetermined constant value, during successive molding operations using the mold assembly, resulting in a high risk of variation in the thickness value of the lens blanks to be formed by the mold assembly. Further, the absence of the axial stopper in the mold assembly may cause a variation in the volume of the liquid reservoir defined by the upper mold and the intermediate sleeve, giving rise to an insufficient amount of supply of the liquid monomer composition from the liquid reservoir into the mold cavity due to an insufficient volume of the liquid reservoir, upon shrinking of the mass of the monomer composition in the mold cavity due to its polymerization. The insufficient amount of supply of the liquid monomer composition from the liquid reservoir into the mold cavity may lead to a high risk of a failure to form the lens blank with desired configuration and size.

SUMMARY OF THE INVENTION

It is therefore an object of the present invention to provide a mold assembly which permits a mold cavity to be formed with a predetermined constant axial dimension, and also permits a liquid reservoir to be formed with a predetermined constant volume, thereby assuring a stable molding operation to form the lens blank with a high degree of consistency in its thickness and a high degree of configurational accuracy, without configurational defects due to shrinkage of the monomer composition in the mold cavity.

The above object may be achieved according to the principle of this invention, which provides a mold assembly having a mold cavity to be filled with a liquid monomer composition which is polymerized to form a lens blank having a size sufficient to manufacture a desired ophthalmic lens, comprising: an upper mold including a generally cylindrical body portion, an outward flange portion extending radially outwardly from one of opposite ends of the body portion, and an annular engaging portion which extends from the outward flange portion in an axial direction thereof from the one of the opposite ends of the body portion toward the other of the opposite ends, the annular engaging portion having an outer surface; a lower mold having a tapered outer surface; and an intermediate sleeve for removably connecting the upper and lower molds, the intermediate sleeve including a lower portion, an upper portion and an intermediate portion intermediate between the lower and upper portions, the lower portion having a lower tapered inner surface for press-fitting engagement with the tapered outer surface of the lower mold, to effect fluid-tight connection of the lower mold and the intermediate mold. The upper portion of the intermediate sleeve has an upper tapered inner surface whose diameter is larger than an inside diameter of an inner surface of the intermediate portion. The intermediate sleeve further includes a shoulder between the upper tapered inner surface of the upper portion and the inner surface of the intermediate portion. The outer surface of the annular engaging portion of the upper mold is provided for press-fitting engagement with the upper tapered inner surface of the intermediate sleeve, to effect fluid-tight connection of the upper mold and the intermediate sleeve, with the body portion of the upper mold being held in abutting contact with the shoulder in an axial direction of the intermediate sleeve, such that the upper mold and the intermediate sleeve cooperate with the lower mold to define the mold cavity, with the tapered outer surface of the lower mold being held in press-fitting engagement with the lower tapered inner surface of the intermediate sleeve. The press-fitting engagement of the outer surface of the annular engaging portion of the upper mold with the upper tapered inner surface of the intermediate sleeve cooperates with the abutting contact of the body portion with the shoulder, to define a liquid reservoir for storing an excess amount of the liquid monomer composition which has been discharged from the mold cavity when the mold cavity is defined by fluid-tight connection of the upper and lower molds to the intermediate sleeve. The intermediate sleeve and the lower mold cooperate to provide a stopper for determining a relative axial position therebetween.

In the mold assembly of the present invention constructed as described above, the outer surface of the annular engaging portion of the upper mold and the tapered outer surface of the lower mold are brought into press-fitting engagement with the respective upper and lower tapered inner surfaces of the intermediate sleeve, with the body portion of the upper mold being held in abutting contact with the shoulder of the intermediate sleeve in the axial direction of the intermediate sleeve, and with the relative axial position of the lower mold and the intermediate sleeve being prevented by the stopper, such that the upper and lower molds and the intermediate sleeve cooperate to define the mold cavity, and such that the liquid reservoir is defined by the press-fitting engagement of the outer surface of the engaging portion of the upper mold with the upper tapered inner surface of the intermediate sleeve, and the abutting contact of the body portion with the shoulder of the intermediate sleeve.

The outer surface of the annular engaging portion of the upper mold may be a tapered or radially inwardly curved surface, which can be easily brought into press-fitting engagement with the upper tapered inner surface of the intermediate sleeve, until the body portion of the upper mold comes into abutting contact with the shoulder of the intermediate sleeve in the axial direction in which the upper mold is partially press-fitted in the intermediate sleeve. The abutting contact of the upper mold at its body portion with the shoulder of the intermediate sleeve establishes a predetermined relative axial position between the upper mold and the intermediate sleeve. On the other hand, the tapered outer surface of the lower mold is brought into press-fitting engagement of the lower tapered inner surface of the intermediate sleeve, until the predetermined relative axial position of the lower mold and the intermediate sleeve is established by the stopper. Thus, the axial positions of the upper and lower molds relative to the intermediate sleeve can be easily established with high accuracy when the upper and lower molds are fluid-tightly connected to the intermediate sleeve so as to form the mold assembly in the closed state.

Thus, the upper and lower molds are assembled with the intermediate sleeve by press-fitting engagements of the appropriate surfaces, so as to permit accurate and easy positioning of the upper and lower molds relative to each other in the axial direction, with a predetermined axial spacing distance therebetween, which determines a predetermined nominal axial dimension of the mold cavity. In addition, the liquid reservoir is automatically formed by the press-fitting engagement of the body portion of the upper mold with the shoulder of the intermediate sleeve and the press-fitting engagement of the outer surface of the annular engaging portion of the upper mold with the upper tapered inner surface of the intermediate sleeve. Since the assembling establishes the predetermined axial relative position of the upper mold and the intermediate sleeve, the liquid reservoir defined by the upper mold and the intermediate sleeve has a predetermined nominal volume.

The mold assembly constructed as described above permits a lens blank to be formed without a variation in the thickness value. Further, the present mold assembly does not suffer from an insufficient volume of the liquid reservoir, that is, an insufficient capacity of the liquid reservoir for storing an excess amount of the liquid monomer composition which has been discharged from the mold cavity when the mold cavity is defined upon assembling of the upper and lower molds with the intermediate sleeve. The insufficient capacity of the liquid reservoir would result in an insufficient amount of supply of the liquid monomer composition from the liquid reservoir to the mold cavity. Accordingly, the present mold assembly permits accurate molding of the lens blank with a desired thickness, and without dimensional and configurational defects due to polymerization shrinkage of the liquid monomer composition.

In a first preferred form of this invention, the lower mold includes a lower cavity-defining portion having a lower cavity-defining surface which partially defines the mold cavity and which is at least partially constituted by a tapered surface whose diameter increases in an axial direction from the lower mold toward the upper mold, so that the lower cavity-defining surface gives the lens blank a convex outer surface having a tapered portion corresponding to the tapered surface.

The lens blank formed by the mold assembly according to the above preferred form of the invention has the convex outer surface including having a tapered portion. When the lens blank is subjected to a cutting operation on its inner surface to give a back surface of an ophthalmic lens to be eventually manufactured, the lens blank is held at the tapered portion of its convex outer surface in pressing contact with a tapered bearing surface of a suitable blank holding jig attached to a cutting apparatus such as a turning machine. Thus, the tapered portion of the convex outer surface of the lens blank can be effectively utilized to facilitate the positioning of the lens blank on the cutting apparatus such that the center axis of the lens blank is aligned with the axis of the cutting apparatus. Accordingly, the present mold assembly assures improved efficiency of production of the ophthalmic lens whose back surface is shaped with a high degree of configurational accuracy as a result of cutting the inner surface of the lens blank.

In one advantageous arrangement of the above first preferred form of the invention, the lower cavity defining surface of the lower mold consists of a central flat surface extending in a radial direction of the intermediate sleeve, and an annular tapered surface which is formed as the tapered surface so as to extend radially outwardly from a periphery of the central flat surface, so that the convex outer surface of the lens blank consists of a central flat portion and an annular tapered portion extending radially outwardly from a periphery of the central flat portion. The outer surface of the lens blank formed by the mold assembly according to this advantageous arrangement is similar in configuration to the front surface of the ophthalmic lens to be manufactured, so that the time required for cutting the lens blank into the desired ophthalmic lens, and the amount of removal of the material from the lens blank, can be effectively reduced.

The tapered surface of the lower cavity-defining surface may be inclined with respect to a plane perpendicular to an axis of the intermediate sleeve, by an angle of not larger than 45°, preferably, within a range of 10–35°, so that the configuration of the outer surface of the lens blank is made similar to that of the front surface of the desired ophthalmic lens, to further reduce the required cutting time and the material cost of the lens blank for the ophthalmic lens, while assuring accurate clamping and positioning of the lens blank at the tapered portion of its outer surface on and relative to the cutting apparatus via the blank holder jig.

In a second preferred form of this invention, the lower mold includes a lower cavity-defining portion having a lower cavity-defining surface which partially defines the mold cavity and which is at least partially constituted by a curved concave surface whose profile follows a profile of a convex front surface of the ophthalmic lens, so that the lower cavity-defining surface gives the lens blank an outer surface having a convex portion corresponding to the curved concave surface. Since the lens blank formed by the mold assembly according to this preferred form of the invention has the outer surface including the convex portion whose profile follows the profile of the convex front surface of the ophthalmic lens, a cutting operation on the outer surface of the lens blank is not necessary to manufacture the ophthalmic lens, so that the efficiency of manufacture of the ophthalmic lens is effectively improved.

In a third preferred form of this invention, the lower mold includes a lower cavity-defining portion having a lower cavity-defining surface which partially defines the mold cavity, and which has a stepped bore formed therein and a stepped bottom surface, the stepped bore having a plurality of portions having respective different diameters which increase in an axial direction from the lower mold toward the upper mold, the lower cavity-defining surface giving the lens blank a convex outer surface including a stepped portion corresponding to the stepped bottom surface of the stepped bore.

In one advantageous arrangement of the third preferred form of the invention, the above-described plurality of portions include a small diameter portion and a large diameter portion which has a substantially coaxial relationship with the small diameter portion and which is located nearer to the upper mold in the axial direction than the small diameter portion, so that the convex outer surface of the lens blank includes a small diameter portion and a large diameter portion.

In a fourth preferred form of this invention, the lower mold includes a lower cavity-defining portion having a lower cavity-defining surface which partially defines the mold cavity and which consists of a flat surface.

In a fifth preferred form of this invention, wherein the generally cylindrical body portion of the upper mold includes a curved bottom portion which is convex in the axial direction from the above-indicated one of the opposite ends of the body portion toward the other end and which partially defines the mold cavity. The curved bottom portion has a thickness small enough to be elastically deformable so as to accommodate a change of a volume of the mold cavity. In the present mold assembly wherein the body portion of the upper mold has the downwardly convex curved bottom portion, an increase or decrease of the volume of the mold cavity which may take place due to polymerization of the liquid monomer composition can be effectively accommodated or absorbed by the elastic deformation of the thin-walled curved bottom portion of the body portion of the upper mold. Accordingly, the lens blank formed by using this mold assembly has a reduced residual strain, and is free from a local chipping which may arise due to a considerable amount of shrinkage of the liquid monomer composition. For improving the functions of the curved bottom portion of the upper mold, the thickness of the curved bottom portion is preferably not larger than 2 mm, and more preferably, within a range of 0.5–1.0 mm.

In a sixth preferred form of this invention, the upper mold has an upper cavity-defining portion having an upper cavity-defining surface which partially defines the mold cavity and which is at least partially constituted by a curved convex surface whose profile follows a profile of a concave back surface of the ophthalmic lens, so that the upper cavity-defining surface gives the lens blank an inner surface having a concave portion corresponding to the curved convex surface. Since the lens blank formed by the mold assembly according to this preferred form of the invention has the inner surface including the concave portion whose profile follows the profile of the concave back surface of the ophthalmic lens, a cutting operation on the inner surface of the lens blank is not necessary to manufacture the ophthalmic lens, so that the efficiency of manufacture of the ophthalmic lens is effectively improved.

In a seventh preferred form of this invention, at least one air vent is formed through at least one of the upper mold and the intermediate sleeve, such that the at least one air vent is open to a space outside the mold assembly, and is in communication with the liquid reservoir when the upper mold is fluid-tightly connected to the intermediate sleeve.

In the above seventh preferred form of the invention, air can be effectively discharged from the mold assembly in the process of fluid-tight connection of the upper mold to a sub-assembly of the lower mold and the intermediate mold to define the mold cavity and the liquid reservoir. Described more specifically, the sub-assembly of the lower mold and the intermediate sleeve which are fluid-tightly connected to each other has a liquid basin in which the liquid monomer composition is poured, before the upper mold is fluid-tightly connected to this sub-assembly so as to define the mold cavity filled with the liquid monomer composition. As the upper mold is press-fitted into the intermediate sleeve of the sub-assembly, the air which may be present between the intermediate sleeve and the upper and lower molds can be discharged through the air vent or vents which is/are eventually communicated with the liquid reservoir. In the present mold assembly, therefore, the amount of the liquid monomer composition to be poured into the liquid basin in the sub-assembly need not be considerably larger that the volume of the mold cavity, but may be only slightly larger that the volume of the mold cavity, in order to avoid trapping of the air in the mold cavity. Accordingly, the cost of the relatively expensive monomer composition is favorably reduced. Further, the at least one air vent is effective to prevent expansion of the air in the liquid reservoir due to a temperature rise upon heating of the liquid monomer composition in the mold cavity for polymerization of the monomer composition. In this respect, it is noted that the expansion of the air would cause a movement of the upper mold in the direction away from the intermediate sleeve, resulting in an undesirable increase in the volume of the mold cavity, which may deteriorate the dimensional and configuration accuracy of the lens blank formed. This drawback can be effectively prevented by the air vent or vents.

In designing the at least one air vent, it is necessary to consider a possibility of volatilization of the liquid monomer composition through each air vent, which may cause a variation in the properties of the composition, and even a local chipping of the formed lens blank, and also possible drawbacks which may arise from a contact of the monomer composition with oxygen in the air introduced in the mold assembly through the air vent or vents. Such drawbacks include yellowish coloring of the lens blank, and inadequate or incomplete polymerization of the monomer composition and consequent insufficient solidification of the monomer composition. In view of those drawbacks, each air vent preferably has a diameter of about 0.5–2.0 mm. Where two or more air vents are provided, the total transverse cross sectional area (total area of opening) of the air vents is preferably 30 mm² or smaller.

In an eighth preferred form of this invention, the intermediate portion of the intermediate sleeve provides an intermediate cavity-defining portion having an intermediate cavity-defining surface which partially defines the mold cavity and which is at least partially constituted by a tapered inner surface whose diameter increases in the axial direction of the intermediate sleeve from the upper mold toward the lower mold, and the intermediate cavity-defining surface gives the lens blank an outer circumferential surface including a tapered portion corresponding to the tapered inner surface, so that the lens blank may be held on one of said intermediate sleeve and said lower mold after said upper mold is removed from said intermediate sleeve. The intermediate cavity-defining surface of the intermediate portion of the intermediate sleeve permits the lens blank to be held on the intermediate sleeve or the lower mold during and after the upper mold is disconnected from the intermediate sleeve, so that the disassembling of the mold assembly to take out the lens blank can be facilitated. The lens blank can be easily removed from the intermediate sleeve or the lower mold.

In one advantageous arrangement of the above eighth preferred form of the invention wherein the intermediate cavity-defining surface is provided, the tapered inner surface of the intermediate cavity-defining surface of the intermediate cavity-defining portion is inclined at an angle of not larger than 10° with respect to an axis of the intermediate sleeve. Since the taper angle of the tapered inner surface of the intermediate cavity-defining surface is not larger than 10°, the outer circumferential surface of the lens blank having the corresponding taper angle does not cause a large difference in configuration of the peripheral portion between the lens blank and the ophthalmic lens to be eventually manufactured.

In a ninth preferred form of the invention, a minimum dimension of the mold cavity in the axial direction of the intermediate sleeve is determined such that the lens blank has a minimum thickness of 0.5–2.0 mm. The lens blank whose minimum thickens is within this range may be suitably machined into the desired ophthalmic lens such as a contact lens.

Preferably, the upper mold, the intermediate sleeve and the lower mold are formed of a synthetic resin material.

The stopper for determining the relative axial position of the intermediate sleeve and the lower mold may include a first annular stop surface which extends in a radial direction of the intermediate sleeve and which connects the inner surface of the intermediate portion of the intermediate sleeve and the lower tapered inner surface of the lower portion, and a second annular stop surface which extends in the radial direction and which is provided at one of opposite ends of the tapered outer surface of the lower mold on the side of the intermediate sleeve. Alternatively, the stopper may include a stopper tab extending from a lower end face of the lower portion of the intermediate sleeve in the axial direction, and a shoulder surface which extends in a radial direction of the intermediate sleeve and which is provided at one of opposite ends of the tapered outer surface of the lower mold remote from the intermediate sleeve.

BRIEF DESCRIPTION OF THE DRAWINGS

The above and optional objects, features, advantages and technical and industrial significance of this invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
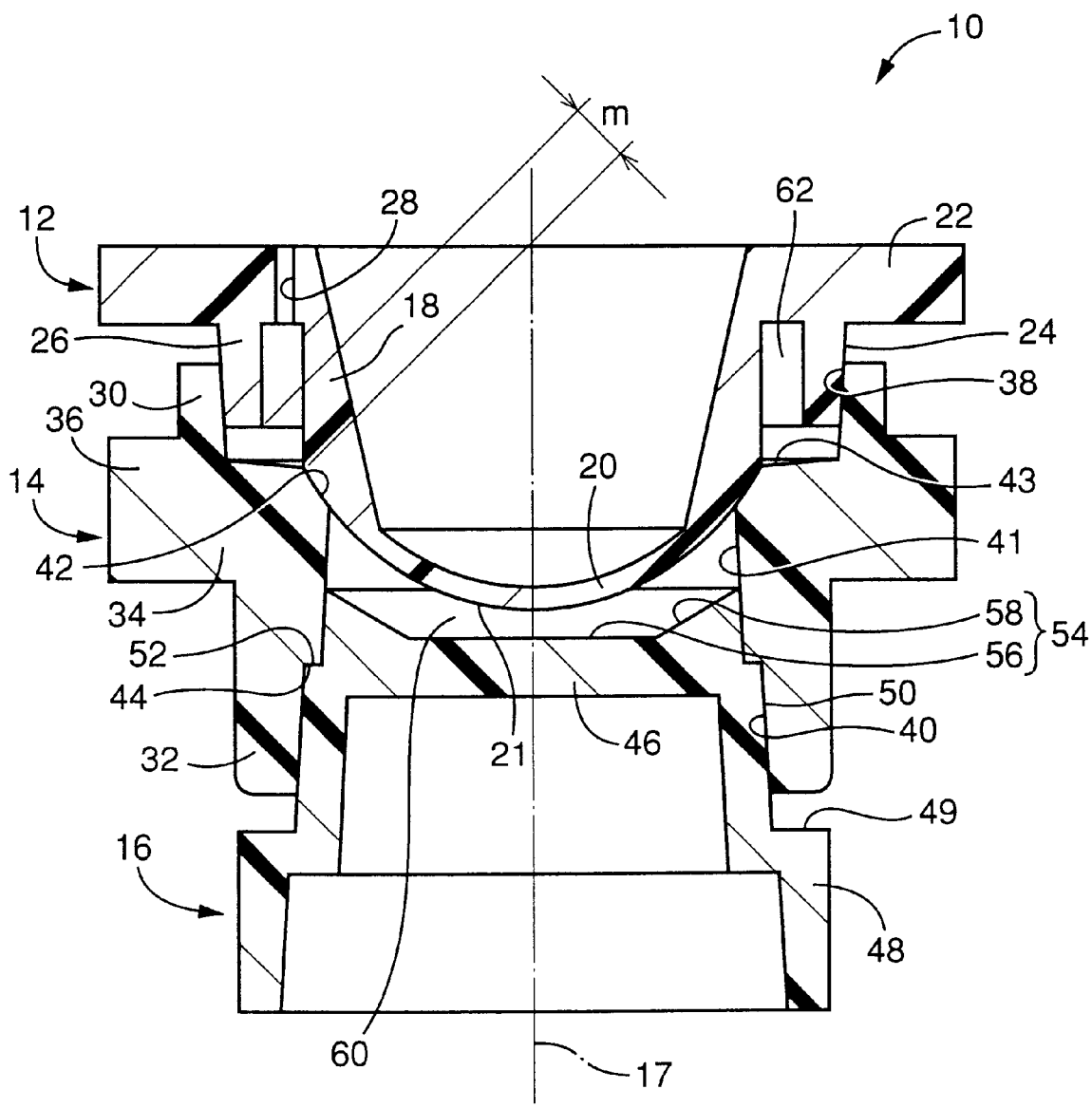
FIG. 1 is an elevational view in axial cross section of a lens blank mold assembly constructed according to one embodiment of this invention.

Referring to FIG. 1, there is shown a mold assembly 10 constructed according to a first embodiment of this invention for forming a lens blank which is to be subject to a cutting operation to produce an ophthalmic lens in the form of a contact lens. The mold assembly 10 is a three-piece assembly consisting of an upper mold 12, an intermediate sleeve 14 and a lower mold 16.

The upper mold 12, intermediate sleeve 14 and lower mold 16 are formed of a suitable resin material known in the art, which is selected, for instance, from among synthetic resins such as: a polyolefin resin such as polyethylene or polypropylene; polystryrene; polycarbonate; polymethylmethacrylate; copolymer of ethylene and vinyl alcohol; polyacetal; polyimide; polyester; and polysulfone. The upper mold 12, intermediate sleeve 14 and lower mold 16 may be efficiently formed of such a synthetic resin material, by injection molding. For easier removal of the lens blank from those elements 12, 14, 16 of the mold assembly 10, these elements are preferably formed of polypropylene.

The upper mold 12 of the mold assembly 10 consists of a cylindrical portion 18, and a thin-walled part-spherical bottom portion 20, an outward flange portion 22, and an annular engaging portion 26, which are formed integrally with the cylindrical portion 18. The cylindrical portion 18 and the part-spherical portion 20 constitute a generally cylindrical body portion of the upper mold 12. The part-spherical bottom portion 20 is a relatively thin, easily deformable, downwardly convex, part-spherical wall which closes a lower open end of the cylindrical portion 18. The outward flange portion 22 is an annular portion extending radially outwardly from an upper open end of the cylindrical portion 18. The annular engaging portion 26 extends downwardly from a radially inner part of the outward flange portion 22, having an inside diameter larger than an outside diameter of the cylindrical portion 18 so that an annular space having a suitable radial dimension is formed between the cylindrical portion 18 and the annular engaging portion 26.

The cylindrical portion 18 has a lower end portion whose outer surface cooperates with the outer surface of the part-spherical bottom portion 20 to define a part-spherical outer surface of the upper mold 12, which serves as an upper cavity-defining surface 21 partially defining a mold cavity 60 which will be described. In other words, the cylindrical portion 18 and the part-spherical bottom portion 20 cooperate to provide an upper cavity-defining portion having the upper cavity-defining surface 21. The engaging portion 26 has a tapered outer surface 24 whose diameter decreases in the downward direction. The outward flange 22 has an air vent or breather hole 28 formed through the entire thickness of its radially inner part, in communication with the above-indicated annular space between the cylindrical portion 18 and the engaging portion 26.

The intermediate sleeve 14 consists of an upper large-diameter portion 30, a lower small-diameter portion 32, a connecting portion 34 interposed between and connecting the large-diameter and small-diameter portions 30, 32, and an outward flange portion 36 extending radially outwardly from the connecting portion 34. The large-diameter and small-diameter portions 30, 32 provide an upper opening and a lower opening of the intermediate sleeve 14, respectively. The connecting portion 34 has an inside diameter smaller than that of the lower small-diameter portion 32.

The upper large-diameter portion 30 of the intermediate sleeve 14 has an upper tapered inner surface 38 defining the above-indicated upper opening of the intermediate sleeve 14. The upper tapered inner surface 38 has a diameter increasing in the upward direction, for engagement with the tapered outer surface 24 of the engaging portion 26. The lower small-diameter portion 32 has a lower tapered inner surface 40 having a diameter which increases in the downward direction.

The connecting portion 34 of the intermediate sleeve 14 has an intermediate tapered inner surface 41 having a diameter which increases in the downward direction. This intermediate tapered inner surface 41 serves as an intermediate cavity-defining surface partially defining the mold cavity 60. In other words, the connecting portion 34 serves as an intermediate cavity-defining portion having the intermediate cavity defining surface 41. The connecting portion 34 further has a shoulder in the form of a part-spherical surface 42 formed adjacent to the upper end of the intermediate tapered inner surface 41. The part-spherical surface 42 is a curved surface following the curve of the above-indicated upper cavity-defining surface 21 whose inner part is provided by the part-spherical bottom wall 20. The intermediate tapered inner surface 41 has the largest diameter which is smaller than the smallest diameter of the lower tapered inner surface 40 of the lower small-diameter portion 32. The intermediate tapered inner surface 41 has a taper angle of not larger than 10° with respect to an axis 17 of the mold assembly 10.

The connecting portion 34 of the intermediate sleeve 14 further has an annular ramp surface 43 which connects the part-spherical surface 42 and the upper tapered inner surface 38 of the upper large-diameter portion 30. The annular ramp surface 43 is inclined downwardly as it extends in the radially inward direction toward the axis 17. The intermediate sleeve 14 has a shoulder on its inner surface, between the lower tapered inner surface 40 of the lower small-diameter portion 32 and the intermediate tapered surface 41 of the connecting portion 34. This shoulder is partially defined by an annular stop surface 44 extending in the radial direction of the intermediate sleeve 14, at right angles to the axis 17.

The lower mold 16 includes a circular disc-like lower cavity-defining portion 46 which has a constant thickness and partially defines the mold cavity 60, as described below in detail, and a stepped cylindrical base portion 48 which extends downwardly from the outer periphery of the lower cavity-defining portion 46. The stepped cylindrical base portion 48 consists of an upper small-diameter part and a lower large-diameter part whose diameter is larger than that of the upper small-diameter part. An outer circumferential surface of the lower cavity-defining portion 46 and an outer circumferential surface of the small-diameter part of the stepped cylindrical base portion 48 cooperate to provide a stepped tapered outer surface 50 whose diameter decreases in the upward direction. This stepped tapered outer surface 50 follows a stepped tapered inner surface consisting of the intermediate tapered inner surface 41 of the connecting portion 34 and the lower tapered inner surface 40 of the small-diameter portion 32.

The stepped tapered outer surface 50 has a shoulder between the two portions corresponding to the intermediate and lower tapered outer surfaces 41, 40. This shoulder is partially defined by an annular stop surface 52 extending in the radial direction of the lower mold 16, at right angles to the axis 17. As described below, the annular stop surface 52 of the lower mold 16 is provided for abutting contact with the annular stop surface 44 of the intermediate sleeve 14.

The stepped cylindrical base portion 48 has an annular shoulder surface 49 between its upper small-diameter and lower large-diameter parts. This shoulder surface 49 is formed adjacent to the lower end of the stepped tapered outer surface 50, and is located a suitable distance below the lower end face of the lower small-diameter portion 32 of the intermediate sleeve 14 when the lower mold 16 is fluid-tightly assembled with or connected to the intermediate sleeve 14 such that the stepped tapered outer surface 50 is in press-fitting engagement with the intermediate and lower tapered inner surfaces 41, 40 of the intermediate sleeve. By utilizing an annular gap provided between the annular shoulder surface 49 and the lower end face of the intermediate sleeve 14, at least one of the intermediate sleeve 14 and the lower mold 16 is chucked or clamped when the intermediate sleeve 14 and the lower mold 16 are separated from each other before the molded lens blank is removed. This annular gap preferably has an axial dimension of 1mm or larger.

The lower cavity-defining portion 46 of the lower mold 16 has an upper surface in the form of a lower cavity-defining surface 54 which partially defines the mold cavity 60 in the mold assembly 10 in the closed state. The lower cavity-defining surface 54 consists of a central circular flat surface 56 perpendicular to the axis 17, and an outer annular tapered surface 58 extending radially outwardly from the outer periphery of the central circular flat surface 56. The annular tapered surface 58 has a diameter which increases in the upward direction, and is inclined by an angle of 30° with respect to the flat surface 56, that is, with respect to a plane perpendicular to the axis 17.

To assemble the upper mold 12, intermediate sleeve 14 and lower mold 16 into the mold assembly 10 placed in the closed state as shown in FIG. 1, the upper mold 12 is positioned relative to the intermediate sleeve 14 such that the upper tapered outer surface 24 of the annular engaging portion 26 of the upper mold 12 is in press-fitting engagement with the upper tapered inner surface 38 of the intermediate sleeve 14, while the part-spherical lower part of the outer surface of the cylindrical portion 18 of the upper mold 12 is in contact with the shoulder in the form of the part-spherical surface 42 of the connecting portion 34 of the intermediate sleeve 14 in the axial direction. Further, the lower mold 14 is positioned relative to the intermediate sleeve 14 such that the stepped tapered outer surface 50 is in press-fitting engagement with the intermediate tapered inner surface 41 and the lower tapered inner surface 40 of the intermediate sleeve 14, with the annular stop surface 52 of the lower mold 16 being held in abutting contact with the annular stop surface 44 of the connecting portion 34 of the intermediate sleeve 34 in the axial direction.

In the mold assembly 10 in the closed state as shown in FIG. 1, therefore, the upper and lower molds 12, 16 are partially press-fitted in the respective upper and lower portions of the intermediate sleeve 14, so as to prevent further movements of the upper and lower molds 12, 16 in the respective downward and upward directions relative to the intermediate sleeve 14, and so as to secure fluid tightness between the upper mold 12 and the intermediate sleeve 14 and fluid tightness between the lower mold 16 and the intermediate sleeve 14. It will be understood that the annular stop surface 52 of the lower mold 16 and the annular stop surface 44 of the intermediate sleeve 14 constitute a stopper for determining a relative axial position between the lower mold 16 and the intermediate sleeve 14, and therefore a relative axial position between the lower and upper molds 16, 12.

As indicated above, the mold assembly 10 placed in the closed state of FIG. 1 has the mold cavity 60 which is to be filled with a liquid monomer composition for forming a lens blank, as described below in detail. The mold cavity 60 is defined by: the lower cavity-defining surface 54 of the lower cavity-defining portion 46 of the lower mold 16; the intermediate cavity-defining surface in the form of the intermediate tapered inner surface 41 of the connecting portion 34 of the intermediate sleeve 14; and the upper cavity-defining surface 21 provided by the cylindrical portion 18 and the part-spherical bottom portion 20 of the upper mold 12. The mold cavity 60, which is a substantially fluid-tight space, is shaped and dimensioned to mold a lens blank having desired configuration and size. In particular, the mold cavity 60 has a predetermined axial dimension determined by the press fitting of the tapered outer surface 24 and the upper tapered inner surface 38 and the abutting contact of the annular stop surfaces 44, 52.

The mold assembly 10 in the closed state further has an annular liquid reservoir 62 formed at an axial position above the mold cavity 60, more precisely, above the part-spherical surface 42 of the intermediate sleeve 14 in abutting contact with the corresponding lower part of the outer surface of the cylindrical portion 18 of the upper mold 12. The annular liquid reservoir 62 is defined by: the annular ramp surface 43 of the connecting portion 34 of the intermediate sleeve 14; the upper tapered inner surface 38 of the large-diameter portion 30 of the intermediate sleeve 14; the outer surface of the cylindrical portion 18 of the upper mold 12; and the inner circumferential surface of the engaging portion 26 of the upper mold 12. The annular liquid reservoir 62 has a bottom defined by the annular ramp surface 43, and has a predetermined volume for accommodating an excess amount of the liquid monomer composition which has been discharged from the mold cavity 60, as described below. The liquid reservoir 62 is in communication with the atmosphere or the environment of the mold assembly 10 through the air vent 28. For communication of the annular liquid reservoir 62 with the mold cavity 60, there is left a small amount of clearance between the part-spherical surface 42 of the intermediate sleeve 14 and the corresponding lower part of the outer surface of the cylindrical portion 18.

The mold assembly 10 is brought into an open or disassembled state by removing the upper and lower molds 12, 16 from the intermediate sleeve 14. It will be understood that the volumes of the mold cavity 60 and the liquid reservoir 62 can be suitably determined by determining the axial positions of the part-spherical surface 42 and the annular stop surface 44 formed on the intermediate sleeve 14, for example. The mold cavity 60 must be dimensioned to form a lens blank whose diameter and thickness are larger than the nominal diameter and thickness of the contact lens to be manufactured, and the liquid reservoir must be dimensioned to have a volume which is sufficient to accommodate an excess amount of the liquid monomer composition which has been discharged from the mold cavity 60 in a molding process to form the lens blank.

Thus, by partially press-fitting the upper and lower molds 12, 16 in the intermediate sleeve 14, the obtained mold assembly 10 is readily provided with the mold cavity 60 formed between the upper and lower molds 12, 16, such that the mold cavity 60 has predetermined diameter and axial dimension for forming a lens blank whose diameter and thickness are larger than the nominal diameter and thickness of the contact lens to be manufactured. The mold assembly 10 is also readily provided with the liquid reservoir 62 above the mold cavity 60, such that the liquid reservoir 62 has a predetermined volume sufficient to accommodate an excess amount of the liquid monomer composition as described above. Accordingly, the mold assembly 10 constructed according to the present embodiment of the invention does not suffer from a considerable variation in the thickness of the lens blank, where the mold assembly 10 is repeatedly used for producing a plurality of pieces of the particular lens blank. In addition, the present mold assembly 10 does not suffer from a shortage of the liquid monomer composition in the mold cavity 60 due to an insufficient amount of supply of the liquid monomer composition from the liquid reservoir 62 into the mold cavity 60 upon shrinking of the composition due to polymerization in the molding process.

Therefore, the present mold assembly 10 permits highly efficient production of the desired lens blank with a high degree of dimensional accuracy, without configurational defects due to shrinkage of the liquid monomer composition due to polymerization.

For example, a lens blank from which a desired contact lens is manufactured may be formed using the present mold assembly 10 in the following manner.

Figure 2:
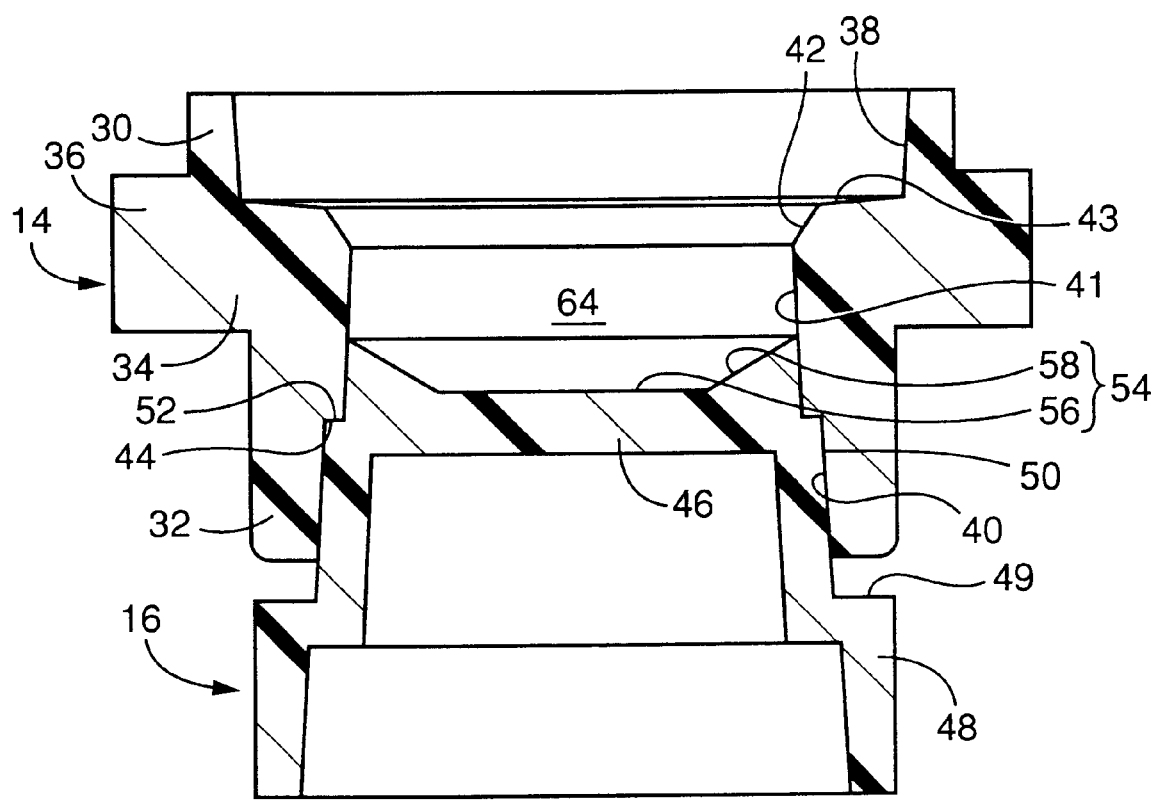
FIG. 2 is an elevational view in axial cross section showing a lower mold and an intermediate sleeve of the mold assembly of FIG. 1, when the lower mold and the intermediate sleeve are assembled together into a sub-assembly one step of a process of forming a lens blank using the mold assembly.

Initially, the lower mold 16 and the intermediate sleeve 14 are fluid-tightly assembled or connected to each other into a sub-assembly as shown in FIG. 2, by moving the lower mold 16 into the lower portion of the intermediate sleeve 14, until the annular stop surface 52 of the lower mold 16 comes into abutting contact with the annular stop surface 44 of the intermediate sleeve 14, so that the stepped tapered outer surface 50 of the stepped cylindrical base portion 48 of the lower mold 16 is in press-fitting engagement with the intermediate tapered inner surface 41 of the connecting portion 34 and the lower tapered inner surface 40 of the small-diameter portion 32 of the intermediate sleeve 14. The thus obtained sub-assembly has a liquid basin 64 defined by the lower cavity-defining surface 54 of the lower cavity-defining portion 46 of the lower mold 16 and the intermediate cavity-defining surface 41 of the intermediate sleeve 14. The intermediate sleeve 14 and the lower mold 16 constructed as described above not only facilitate assembling and disassembling of the above-indicated sub-assembly of FIG. 2, but also assure a high degree of air and liquid tightness.

Figure 3:
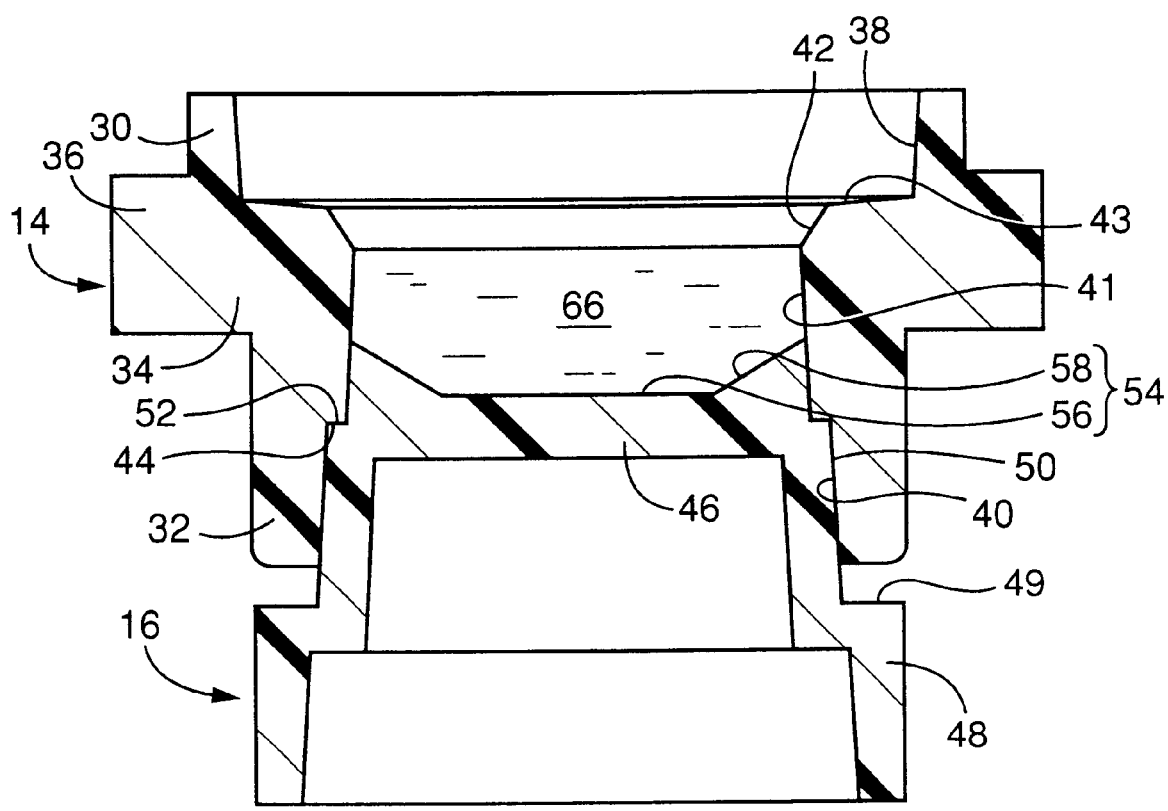
FIG. 3 is an elevational view in axial cross section showing the sub-assembly of FIG. 2, after a liquid monomer composition has been poured into a liquid basic formed in the sub-assembly.

Then, a selected liquid monomer composition 66 for forming the desired lens blank is poured into the liquid basin 64 in the sub-assembly of the lower mold 16 and the intermediate sleeve 14, as shown in FIG. 3. The liquid monomer composition 66 generally includes at least one radically polymerizable compound. Alternatively, the liquid monomer composition 66 may be a macromer or a prepolymer. The radically polymerizable compound indicated above includes at least one of vinyl, allyl, acryl and methacryl groups in its molecule, and is conventionally used as a material for a hard contact lens and a soft contact lens. Examples of the radically polymerizable compound include: esters of (meth)acrylic acid such as alkyl (meth)acrylate, siloxanyl (meth) acrylate, fluoroalkyl (meth)acrylate, hydroxyalkyl (meth)acrylate, polyethyleneglycol (meth) acrylate, or polyhydricalcohol (meth)acrylate; derivatives of styrene; and N-vinyllactam. The liquid monomer composition 66 may include, as needed, a polyfunctional monomer as a cross-linking agent, such as ethyleneglycol di(meth) acrylate or diethyleneglycol di(meth)acrylate. The liquid monomer composition 66 may further include, as additives, a polymerization initiator such as a thermal polymerization initiator or a radiation polymerization initiator, and a photosensitizer. The amount of the liquid monomer composition 66 to be poured into the liquid basin 66 is made larger by a suitable amount than the volume of the mold cavity 60 formed in the mold assembly by assembling the upper mold 12 with the intermediate sleeve 14 of the above-indicated sub-assembly.

After the liquid monomer composition 66 has been poured into the liquid basic 64, the upper mold 12 is moved into the intermediate sleeve 14 until the tapered outer surface 24 of the engaging portion 26 is brought into fitting engagement with the upper tapered inner surface 38 of the large-diameter portion 30 of the intermediate sleeve 14 while the part-spherical lower part of the outer surface of the cylindrical portion 18 of the upper mold 12 is brought into abutting contact with the part-spherical surface 32 of the intermediate sleeve 14, with the part-spherical bottom portion 20 projecting into the liquid basin 64. As a result, the mold cavity 60 having the predetermined axial dimension and filled with the liquid monomer composition 66 is defined by the upper mold 12, intermediate sleeve 14 and lower mold 16, while the liquid reservoir 62 having the predetermined volume and accommodating some amount of the liquid monomer composition 66 is defined by the upper mold 12 and the intermediate sleeve 14, as shown in FIG. 1. As the upper mold 12 is fitted into the intermediate sleeve 14, an excess amount of the liquid monomer composition 66 is forced to flow from the mold cavity 62 in the process of being formed by closure of the liquid basin 64 by the upper cavity-defining surface 21, into the liquid reservoir 62 in the process of being formed.

It is noted that the fitting engagements of the tapered surfaces 24, 38, 40, 41, 42, 50 facilitate not only the assembling and disassembling of the mold assembly 10, but also establishment and maintenance of the air and liquid tightness of the mold cavity 60 and the liquid reservoir 62. It is also noted that air bubbles which may be contained in the mass of the liquid monomer composition 66 may rise along the upper cavity-defining surface 21 into the liquid reservoir 62 as the part-spherical bottom portion 20 is moved into the mass of the composition 66 into the liquid basin 64, and the air bubbles are discharged from the liquid reservoir 62 into the atmosphere through the air vent 28. Thus, the trapping of air bubbles within the mold cavity 66 is effectively prevented. Further, the press-fitting fluid-tight contact of the tapered outer surface 24 of the upper mold 12 with the upper tapered inner surface 38 of the intermediate sleeve 14 assures fluid tightness of the liquid reservoir 62, except at the single air vent 28 having a relatively small diameter, so that a mass of the liquid monomer composition 66 in the liquid reservoir 62 and a mass of the composition 66 in the mold cavity 60 are effectively prevented from being volatilized into the atmosphere or contacting with oxygen in the atmosphere. The diameter of the air vent 28 is preferably within a range of 0.5–2.0 mm, for effectively preventing entry of air into the mold assembly 10 and volatilization of the liquid monomer composition 60 from the mold assembly 10. Where a plurality of air vents are provided, the total transverse cross sectional area (total area of opening) of these air vents is preferably 30 $mm^2$ or smaller.

Figure 4:
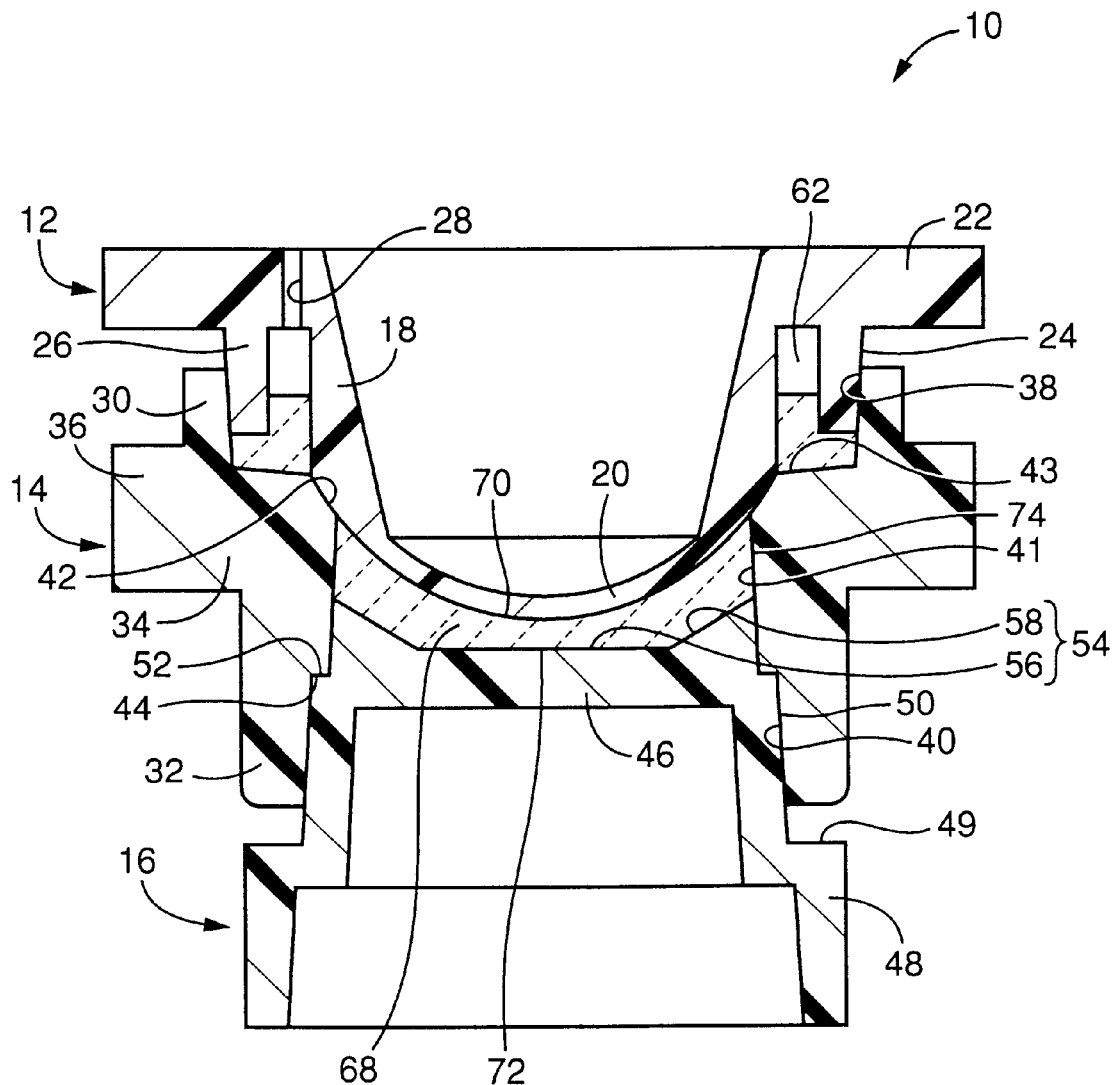
FIG. 4 is an elevational view in axial cross section showing the complete mold assembly consisting of the sub-assembly of FIG. 3 and an upper mold assembled on the intermediate sleeve, after a lens blank is formed in a mold cavity in the mold assembly, by polymerization of the liquid monomer composition.

Then, the liquid monomer composition 66 within the mold cavity 60 is polymerized by an ordinary thermal polymerization method, or by a radiation polymerization method using ultraviolet or other electromagnetic radiation, so that a lens blank 68 is formed in the mold cavity 60, as shown in FIG. 4. The lens blank 68 preferably has a smallest thickness value within a range of 0.5–2.0 mm. The lens blank 68 has an inner surface 70 which gives a back surface of the contact lens by cutting the inner surface 70, and an outer surface 72 which gives a front surface of the contact lens. The inner surface 70 is a part-spherical concave surface following the profile of the upper cavity-defining surface 21 (part-spherical bottom portion 20), while the outer surface 72 is a generally convex surface consisting of a central flat surface which extends perpendicularly to a center axis of the lens blank 68 and which follows the profile of the circular flat surface 56 of the lower cavity-defining surface 54, and an annular tapered surface which extends from the periphery of the circular flat surface. The annular tapered surface of the outer surface 72 is inclined by an angle of 30° with respect to the central flat surface, and has a taper angle corresponding to that of the annular tapered surface 58 of the lower cavity-defining surface 54. The lens blank 68 further has an outer circumferential surface 74 which is tapered following the intermediate tapered inner surface 41 of the intermediate sleeve 14. Since the taper angle of the intermediate tapered inner surface 41 is not larger than 10° with respect to the axis 17 of the mold assembly 10, as described above, the outer circumferential surface 74 of the lens blank 68 has a taper angle of not larger than 10°, so that the outer circumferential surface 74 can be easily cut into the outer circumferential surface of the contact lens. It is also noted that the smallest thickness of the lens blank 68 is selected within a range of 0.5–2.0 mm, in order to reduce the cost of the material (liquid monomer composition 66) for the contact lens.

It is further noted that elastic deformation of the comparatively highly flexible thin-walled part-spherical bottom portion 20 of the upper mold 12 permits an increase or decrease of the volume of the mold cavity 60 during polymerization of the liquid monomer composition 66 in the molding process to form the lens blank 68. In addition, the comparatively small wall thickness of the part-spherical bottom portion 20 assures a high degree of transmittance therethrough of an electromagnetic radiation such as a ultraviolet radiation, thereby facilitating the polymerization of the monomer composition 66 by irradiation with the electromagnetic radiation. For improved flexibility and light transmittance of the part-spherical bottom portion 20, the thickness of this bottom portion 20 is desirably made as small as possible, preferably not larger than 2.0 mm, and more preferably within a range of 0.5–1.0 mm.

Where the amount of elastic deformation of the part-spherical bottom portion 20 is insufficient to accommodate the entire amount of decrease of the volume of the mold cavity 60, due to a considerably large amount of polymerization shrinkage of the liquid monomer composition 66, the liquid monomer composition 66 stored in the liquid reservoir 62 is sucked into the mold cavity 60 through the small clearance left between the part-spherical surface 42 of the intermediate sleeve 14 and the corresponding lower part of the outer surface of the cylindrical portion 18 of the upper mold 12. The sufficiently large volume of the liquid reservoir 62 and the annular ramp surface 43 inclined downwardly in the radially inward direction toward the axis 17 assure an easy supply of the liquid monomer composition 66 in a sufficient amount from the liquid reservoir 62 into the mold cavity 60, making it possible to effectively eliminate configurational defects of the formed lens blank 68 due to polymerization shrinkage of the monomer composition 66 within the mold cavity 60. Where the liquid monomer composition 66 is polymerized by a thermal polymerization method, namely, by heat application to the monomer composition 66, the air within the liquid reservoir 62 is expanded, but is effectively discharged through the air vent 28 into the atmosphere.

Figure 5:
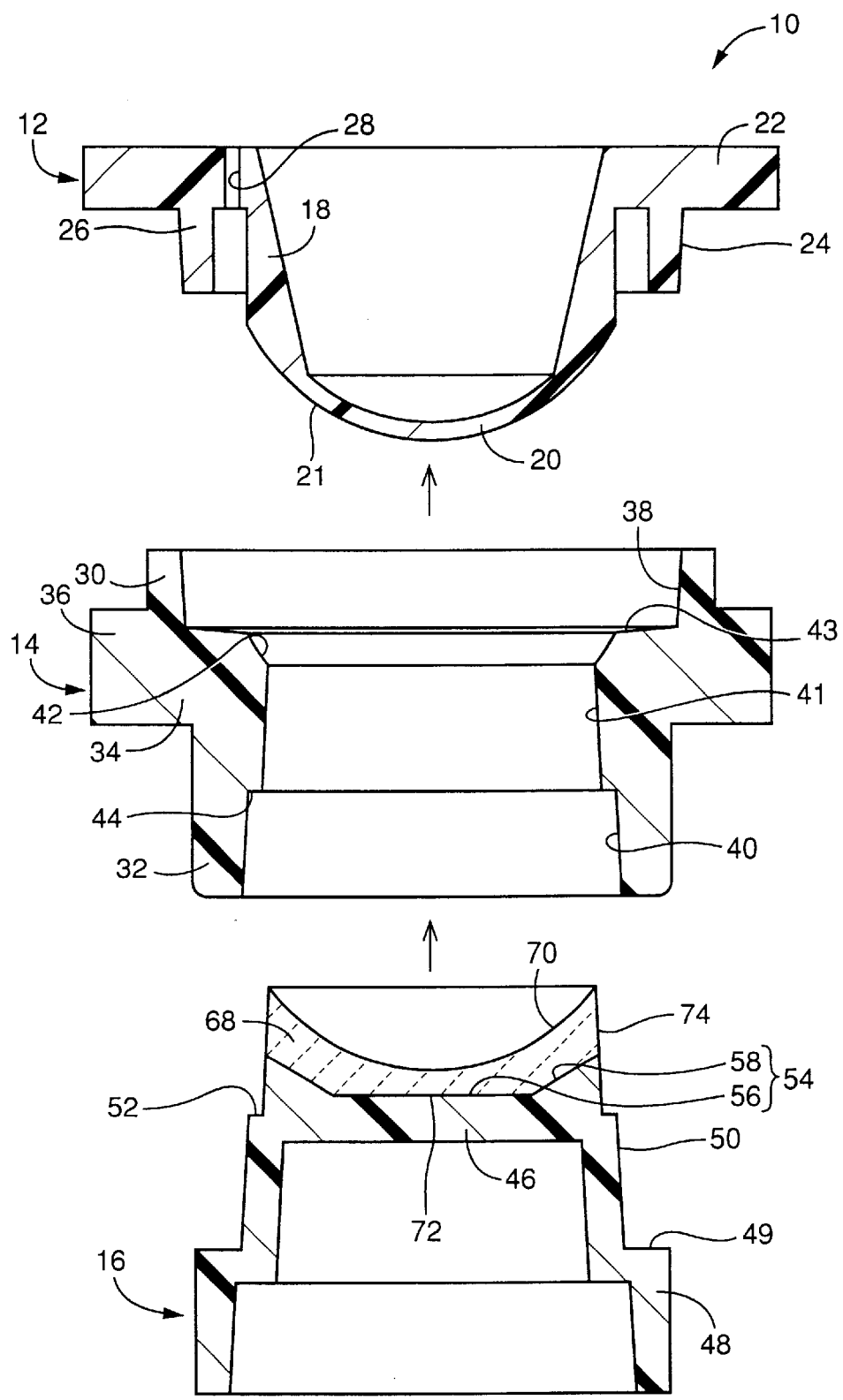
FIG. 5 is an elevational view in axial cross section showing a disassembled state of the mold assembly wherein the upper mold and the intermediate sleeve are separated from the lower mold.

In the next step, the mold assembly 10 in which the lens blank 68 has been formed is disassembled by removing the upper and lower molds 12, 16 from the intermediate sleeve 14, by releasing the press-fitting engagements of the molds 12, 16 from the intermediate sleeve 14, as shown in FIG. 5. Since the outer circumferential surface 74 of the lens blank 68 is held in contact with the intermediate tapered inner surface 41 of the intermediate sleeve 14 whose diameter decreases in the upward direction, the lens blank 68 will not be moved with the upper mold 12, and will remain in sticking contact with the tapered inner surface 41 of the intermediate sleeve 14 or the lower cavity-defining surface 54 of the lower mold 16, after the upper and lower molds 12, 16 and the intermediate sleeve 14 have been separated from each other. In the specific example of FIG. 5, the lens blank 68 remains fixed on the lower cavity-defining surface 54 of the lower cavity-defining portion 46 of the lower mold 16. The lens blank 68 is then removed from the lower mold 16 (or the intermediate sleeve 14). Thus, the lens blank 68 is taken out from the mold assembly 10.

The disassembling of the mold assembly 10 may be effected by first removing the sub-assembly of the upper mold 12 and the intermediate sleeve 14 from the lower mold 16. The upper mold 12 may be removed by collapsing it by applying a force in the radial direction. For easier removal of the lens blank 68 from the mold assembly 10, it is effective to roughen the upper cavity-defining surface 21 of the upper mold 12, the intermediate tapered inner surface 41 of the intermediate sleeve 14 serving as the intermediate cavity-defining surface, and the lower cavity-defining surface 54 of the lower mold 16. These surfaces 21, 41, 54 may be roughened by forming a multiplicity of minute recesses and projections of about 5–25 $\mu$m.

The lens blank 68 thus removed from the mold assembly 10 is subjected to a heat treatment for the purpose of completing the polymerization of the monomer composition or polymerizing the unpolymerized portion of the monomer composition, removing the residual strain in the lens blank 68 and improving the transparency of the lens blank 68.

Figure 6:
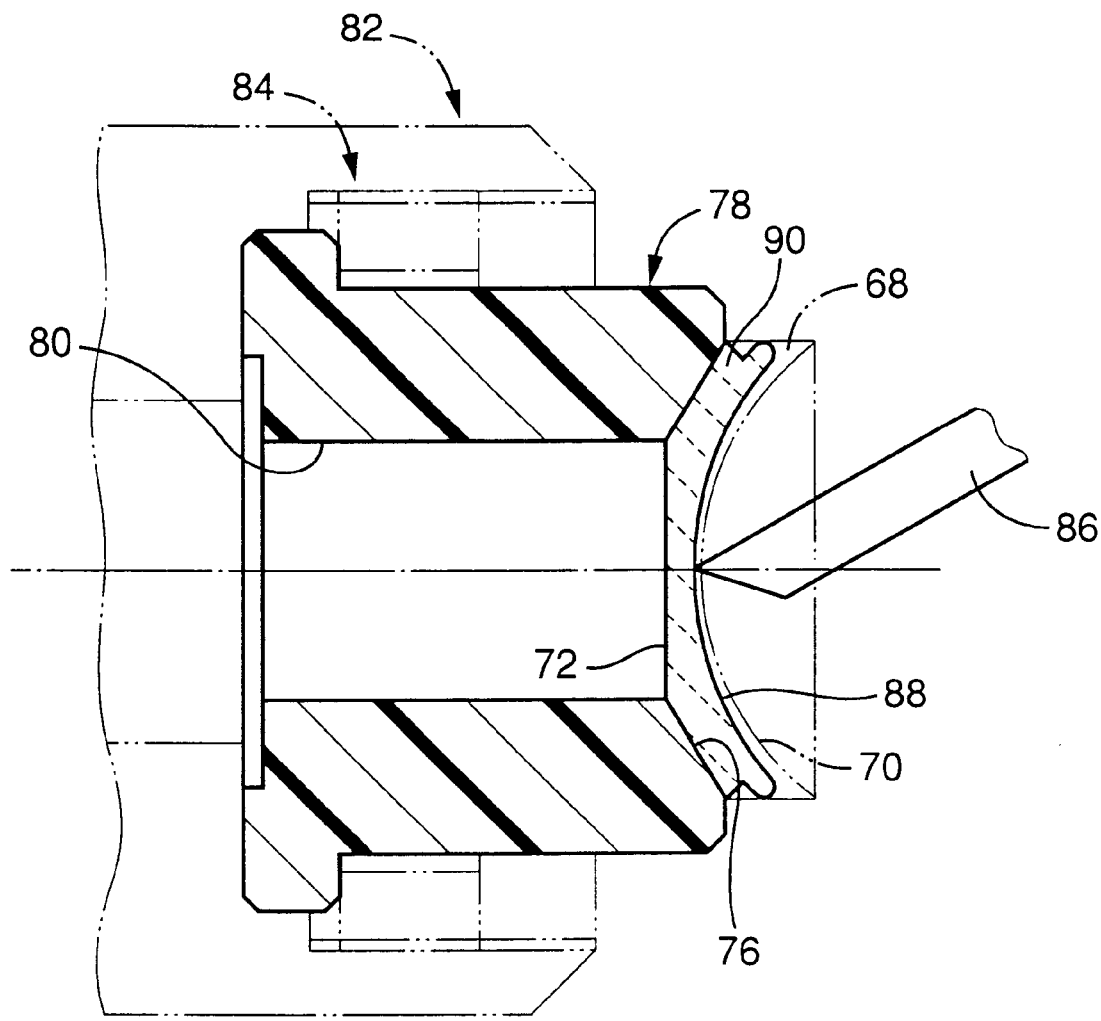
FIG. 6 is an elevational view in axial cross section showing the lens blank which has been removed from the lower mold of the disassembled mold assembly of FIG. 5 and cut on a lathe with a blank holding jig, to form an inner or back surface, an edoe portion and an outer peripheral part of an outer or front surface of a contact lens to be eventually obtained from the lens blank.

The lens blank 68 is then subjected to a cutting operation on the inner surface 70, by a known method, to form the back surface of a contact lens to be manufactured. To perform such a cutting operation, a blank holding jig 78 is clamped in a chucking device 84 mounted on a spindle 82 of a turning machine or lathe, as shown in FIG. 6. The blank holding jig 78 has an annular tapered bearing surface 76 on which the lens blank 68 is held under suction.

Described more specifically, the blank holding jig 78 is a generally cylindrical hollow structure having a center hole serving as an air suction hole 80 extending in the axial direction, and the annular tapered bearing surface 76 at one of its opposite ends. The tapered bearing surface 76 has a taper angle equal to that of an outer annular tapered portion of the outer surface 72 of the lens blank 68. The chucking device 84 for clamping the blank holding jig 78 may be a suitable known device such as a collect chuck. The jig 78 is mounted on the spindle 82 through the chucking device 84 such that the jig 78 is coaxial with the spindle 82. A reduced pressure from a suitable vacuum source is applied to the central flat portion of the outer surface 72 of the lens blank 68 through the air suction hole 80, to hold the lens blank 68 on the jig 78 such that the outer annular tapered portion of the outer surface 72 is held in pressing contact with the annular tapered bearing surface 76 under suction.

The cutting operation on the inner surface 70 of the lens blank 68 is performed by a cutting tool 86 while the lens blank 68 is rotated with the jig 78 and the chucking device 84 by rotation of the spindle 82. As a result of this cutting operation, an intermediate product 90 having an inner surface 88 which provides the back surface of the contact lens is produced. Namely, the intermediate product 90 is a precursor of the contact lens, which will be subjected to a further cutting operation to eventually obtain the desired contact lens, as described below.

The intermediate product 90 having the inner surface 88 has the outer surface 72 on which the above-indicated further cutting operation is to be performed. As indicated above, the outer surface 72 consists of the central flat portion and the outer annular tapered portion which is inclined at 30° with respect to the flat portion such that the diameter of the annular tapered portion increases in the upward direction. Thus, the outer surface 72 has a profile similar to that of the front surface of the contact lens to be manufactured, so that the time required for the cutting operation on the outer surface 72 of the intermediate product 90 is reduced, and the amount of material removal from the intermediate product 90 is also reduced, resulting in a reduced cost of the material for the contact lens. In addition, the outer annular tapered portion of the outer surface 72 which is held in pressing contact with the annular tapered bearing surface 76 of the hollow blank holding jig 78 permits the lens blank 68 to be firmly held on the jig 78. While the outer annular tapered portion of the outer surface 72 is inclined 30° with respect to the central flat portion in this specific example, the angle of inclination of the outer annular tapered portion may be suitably selected. For assuring a high degree of similarity of the profile of the outer surface 72 to the profile of the front surface of the contact lens and firm holding of the lens blank 68 on the jig 78, the angle of inclination of the outer annular tapered portion of the outer surface 72, that is, the angle of inclination of the annular tapered surface 58 of the lower cavity-defining surface 54 of the lower mold 16 is preferably 45° or smaller, and more preferably within a range of 10–35°.

The intermediate product 90 produced by cutting the inner surface 70 of the lens blank 68 is subjected to a cutting operation on the outer surface 72, with a cutting tool on a turning machine as conventionally used for a cutting operation to form the front surface of the contact lens, as disclosed in JP-B2-7-80118, JP-A-3-81385 and JP-A-7-90241. Unlike the lens blank 68, the intermediate product 90 is held on a holder jig, with a bonding adhesive applied to the inner surface 88. An assembly of the intermediate product 90 and the holder jig is clamped on a spindle of the turning machine, and rotated to perform a cutting operation on the outer surface 72 which is opposite to the inner surface 88 bonded to the holder jig. Thus, the desired contact lens having the back surface 88 and the front surface formed by cutting the outer surface 72 is eventually obtained. The contact lens which has been manufactured can be removed from the holder jig, by any one of the known methods, for instance, by reducing the bonding strength of the bonding adhesive by immersing an assembly of the holder jig and the contact lens in a suitable solvent, or by collapsing the holder jig in a suitable manner.

Figure 7:
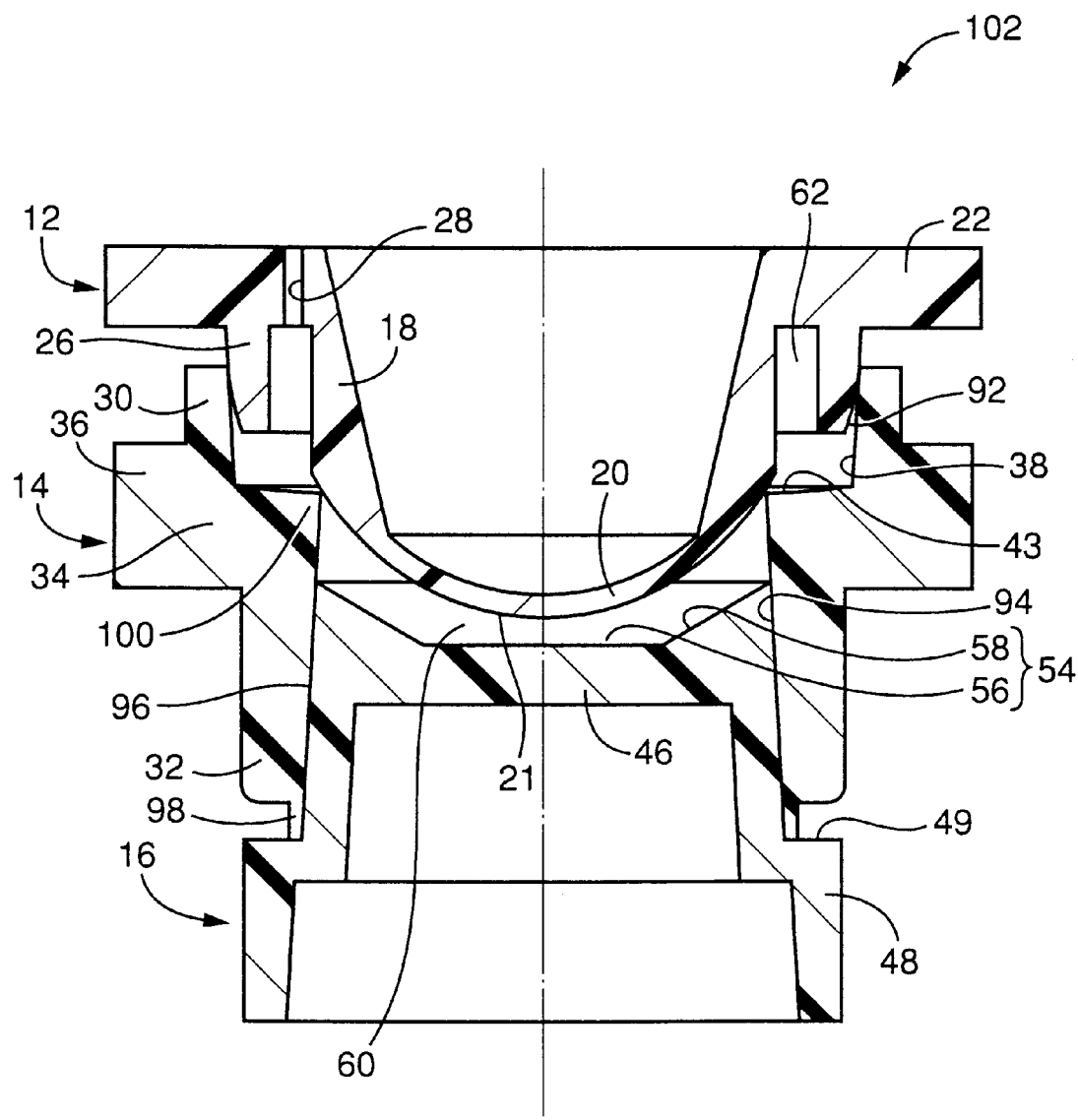
FIG. 7 is an elevational view in axial cross section of a lens blank assembly constructed according to a second embodiment of this invention.

Referring next to FIG. 7, there will be described a mold assembly 102 constructed according to a second embodiment of the present invention. In FIG. 7, the same reference numerals as used in FIG. 1 are used to identify the same elements as in the mold assembly 10.

The mold assembly 102 according to the second embodiment is different from the mold assembly 10 according to the first embodiment, in the structure for the press-fitting engagement of the upper mold 12 and the intermediate sleeve 14, in the structure for abutting contact of the upper mold 12 with the intermediate sleeve 14, and in the stopper for determining the axial position of the lower mold 16 relative to the intermediate sleeve 14. In the mold assembly 102, the annular engaging portion 26 of the upper mold 12 has an upper cylindrical outer surface having a constant diameter in the axial direction, and a lower curved outer surface 92 whose diameter decreases in the downward direction. The outer surface 92 is curved radially inwardly as it extends in the downward direction. Further, the intermediate sleeve 14 has a tapered inner surface 94 in place of the lower and intermediate tapered inner surfaces 40, 41 in the mold assembly 10. The tapered inner surface 94 corresponds to the small-diameter and connecting portions 32, 34 of the intermediate sleeve 14, and has a diameter which increases in the downward direction. Similarly, the lower mold 16 has a tapered outer surface 96 in place of the stepped tapered outer surface 50 in the mold assembly 10. The tapered outer surface 96 corresponds to the lower cavity-defining portion 46 and the small-diameter part of the stepped cylindrical base portion 48, and has a diameter which increases in the downward direction. Unlike the small-diameter portion 32 of the intermediate sleeve 14 in the mold assembly 10 of FIG. 1, the small-diameter portion 32 in the present mold assembly 102 has an integrally formed, thin-walled cylindrical stopper tab 98 extending downwardly from a radially inner part of its lower end face.

Unlike the intermediate sleeve 14 of the mold assembly 10, which has the part-spherical surface 42, the intermediate sleeve 14 of the present mold assembly 102 has a shoulder 100 defined by the annular ramp surface 43 and the tapered inner surface 94. The upper mold 12 is fluid-tightly assembled with or connected to the intermediate sleeve 14 such that the lower curved outer surface 92 of the engaging portion 26 is in press-fitting engagement with the upper tapered inner surface 38 of the intermediate sleeve, while the outer peripheral portion of the upper cavity-defining surface 21 of the upper mold 12 is in abutting contact with the shoulder 100 in the axial direction. On the other hand, the lower mold 16 is assembled with the intermediate sleeve 14 such that the tapered outer surface 96 of the lower mold 16 is in press-fitting engagement with the tapered inner surface 94, while the shoulder surface 49 of the stepped cylindrical base portion 48 of the lower mold 16 is in abutting contact with the end face of the cylindrical stopper tab 98 of the small-diameter portion 32 of the intermediate sleeve 14.

In the mold assembly 102 of FIG. 7, too, the upper and lower molds 12, 16 are partially press-fitted in the respective upper and lower portions of the intermediate sleeve 14, so as to prevent further movements of the upper and lower molds 12, 16 in the respective downward and upward directions relative to the intermediate sleeve 14, and so as to secure fluid tightness between the upper mold 12 and the intermediate sleeve 14 and fluid tightness between the lower mold 16 and the intermediate sleeve 14. The mold assembly 102 placed in the closed state of FIG. 7 also has the mold cavity 60 having a predetermined axial dimension. The mold assembly 102 further has the liquid reservoir 62 having a predetermined volume.

While only one air vent 28 is formed through the upper mold 12 in the mold assemblies 10, 102 described above, a plurality of air vents may be provided for communication between the liquid reservoir 62 and the external space. Further, an air vent or vents may be formed through the intermediate sleeve 14, or through both the upper mold 12 and the intermediate sleeve 14.

The volume or size of the liquid reservoir 62 may be suitably determined by suitably designing the appropriate portions of the upper mold 12 and the intermediate sleeve 14 which cooperate to define the liquid reservoir 62. For instance, a radial dimension of the liquid reservoir 62 is determined by a minimum distance "m" (indicated in FIG. 1) from the radially outermost point of contact between the part-spherical surface 42 and the corresponding portion of the outer surface of the cylindrical portion 18, to the radially innermost point of the engaging portion 26 of the upper mold 12 (or the large-diameter portion 30 of the intermediate sleeve 14). This minimum distance "m" is preferably at least 0.2 mm, in order to prevent a portion of the liquid monomer composition 66 from rising from the liquid basin 64 along the outer surface of the cylindrical portion 18 of the upper mold 12, due to surface tension of the liquid monomer composition 66, before air is discharged into the atmosphere through the air vent 28, when the upper mold 12 is assembled with the sub-assembly of the intermediate sleeve 14 and the lower mold 16 which has the liquid basin 64, that is, when the mold cavity 60 is filled with the liquid monomer composition 66. Namely, the minimum distance "m" of at least 0.2 mm is effective to prevent the air from being trapped within the mold cavity 60. To prevent this air trapping in the mold cavity 60, the minimum distance "m" of the liquid reservoir 62 is more preferably at least 0.3 mm, and most preferably at least 0.4 mm.

For improved fluid tightness between the upper mold 12 and the intermediate sleeve 14, the amount of interference of the press fitting between the engaging portion 26 of the upper mold 12 and the large-diameter portion 30 of the intermediate sleeve 14 is preferably within a range of 0.05–0.2 mm. This amount of interference of the press fitting is a difference in radius of the outside diameter of the engaging portion 26 and the inside diameter of the large-diameter portion 30, which is smaller than the outside diameter of the engaging portion 26.

Figure 8:
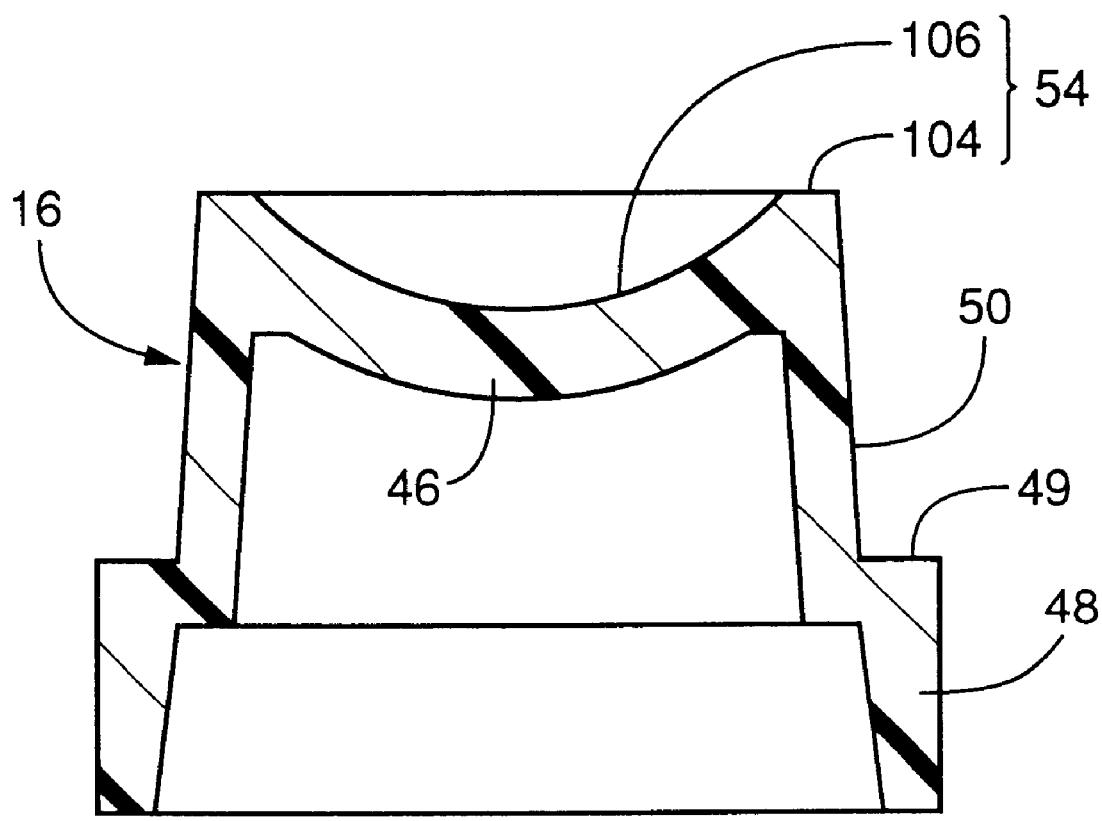
FIG. 8 is an elevational view in cross section of a lower mold of a mold assembly according to a third embodiment of the invention.

In the mold assemblies 10, 102 of FIGS. 1 and 7, the lower cavity-defining surface 54 of the lower cavity-defining portion 46 of the lower mold 16 consists of the central flat surface 56 and the outer annular tapered surface 58 whose diameter increases in the upward direction. However, the lower cavity-defining surface 54 may consist of an annular outer peripheral flat surface 104 and an inner part-spherical surface 106 following a concave profile of a front surface of an ophthalmic lens to be manufactured, as shown in FIG. 8. In this arrangement according to a third embodiment of this invention, the formed lens blank 68 has an outer surface 72 which gives the front surface of the ophthalmic lens without a cutting operation on the outer surface 72. This lens blank 68 is subjected to a relatively simple cutting operation on its edge portion and circumferential surface portion, as described below. Accordingly, the lens blank 68 can be more efficiently cut into the desired ophthalmic lens. It is noted that the provision of the annular outer peripheral flat surface 104 in the lower cavity-defining surface 54 is not essential. That is, the lower cavity-defining surface 54 may consist of only the spherical surface 106.

Figure 9:
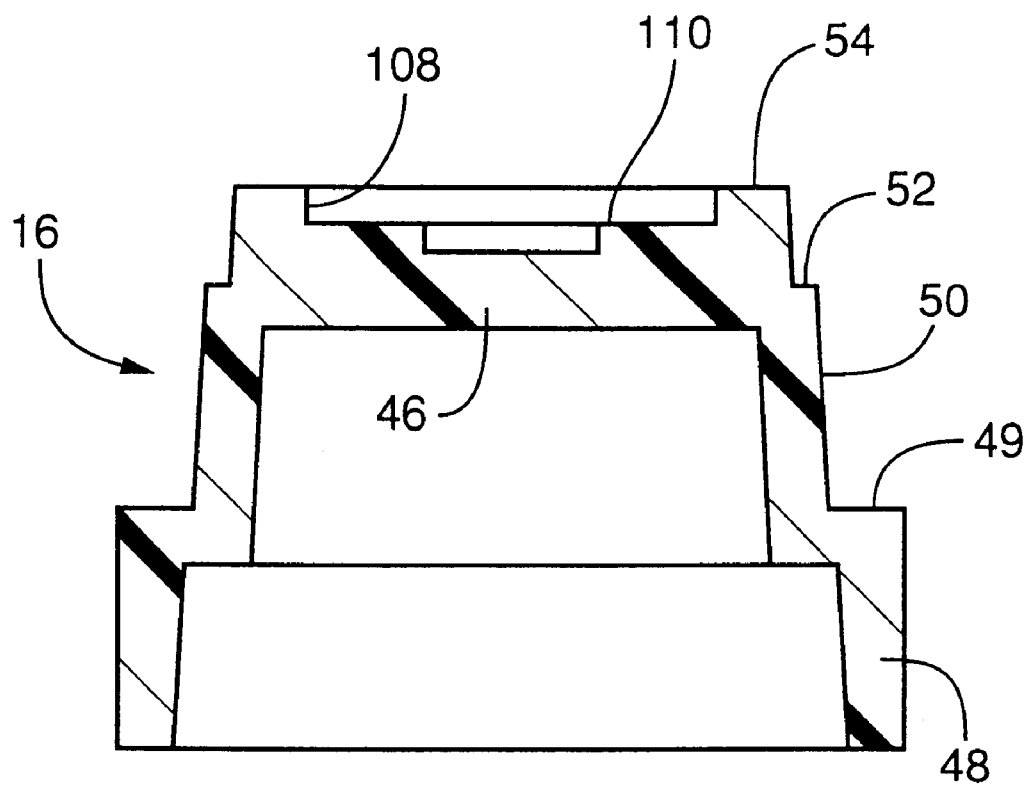
FIG. 9 is an elevational view in cross section of a lower mold of a mold assembly according to a fourth embodiment of the invention.

In addition, the lower cavity-defining surface 54 may be otherwise modified. For example, the lower cavity-defining surface 54 may have a stepped bore 108 formed therein and having a stepped bottom surface 110, as shown in FIG. 9. The stepped bore 108 consists of a small diameter portion and a large diameter portion which have a substantially coaxial relationship with each other. The large diameter portion is positioned nearer to the upper mold 12 in the axial direction than the small diameter portion, so that the diameter of the stepped bore 108 is larger on the side of the upper mold 12 than on the side of the base portion 48 of the lower mold 16. In this arrangement according to a fourth embodiment of this invention, the lower cavity-defining portion 46 of the lower mold 16 gives the lens blank a convex outer surface including a stepped portion corresponding to the stepped bottom surface 110 of the stepped bore 108. It is noted that the stepped bore 108 may have more than two diameter portions having different diameters which increase in the axial direction from the lower mold 16 toward the upper mold 12.

Figure 10:
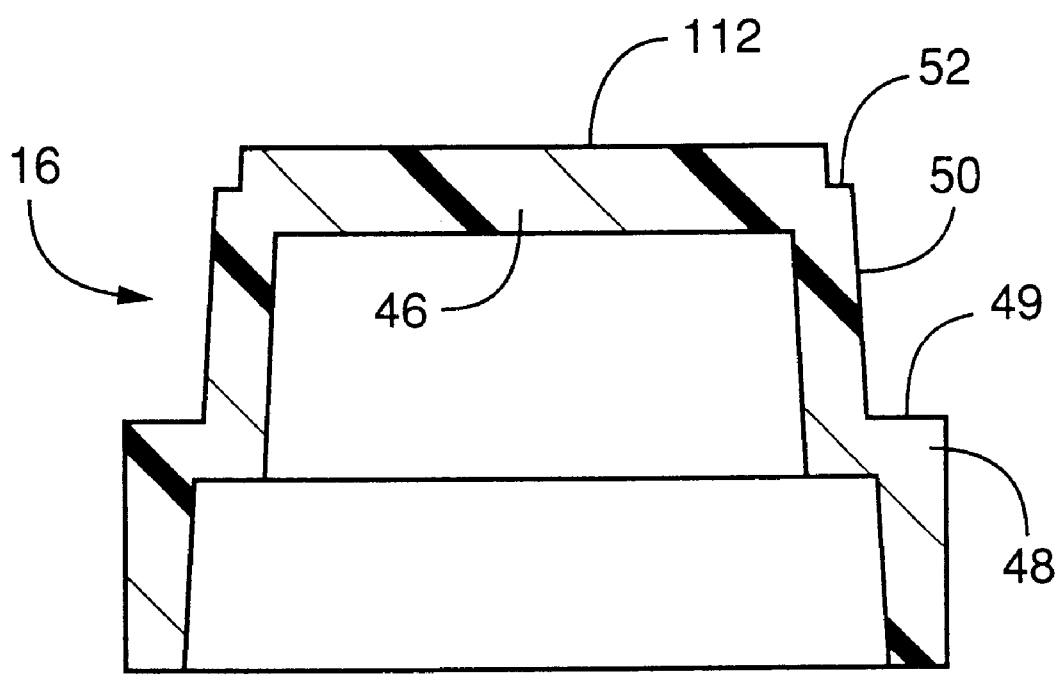
FIG. 10 is an elevational view in cross section of a lower mold of a mold assembly according to a fifth embodiment of the invention.

Further, the lower cavity-defining surface may simply consist of a flat surface 112, as shown in FIG. 10. In this arrangement according to a fifth embodiment of this invention, the lower cavity-defining portion 46 of the lower mold 16 gives the lens blank a flat outer surface.

The lens blank formed with the lower mold 16 constructed as shown in FIG. 8, FIG. 9 or FIG. 10 can be held by a suitable holding jig with a vacuum source or a bonding adhesive applied to the convex or flat outer surface of the lens blank, so that the lens blank is then subjected to a cutting operation on its inner surface, outer surface or edge portion, so as to provide a nominal configuration of the desired ophthalmic lens.

Figure 11:
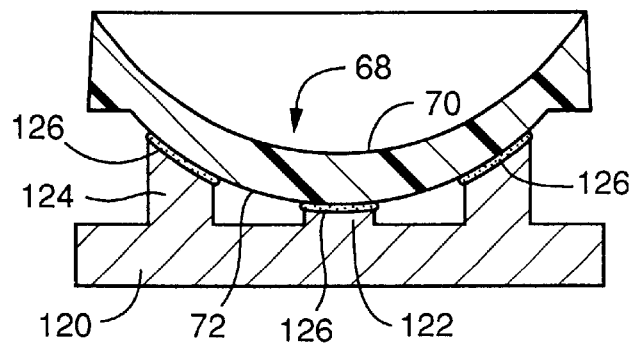
FIG. 11 is an elevational view in cross section of a lens blank formed with the lower mold of FIG. 8, when the lens blank is held by a suitable holding jig in the form of a disk frame.
Figure 12:
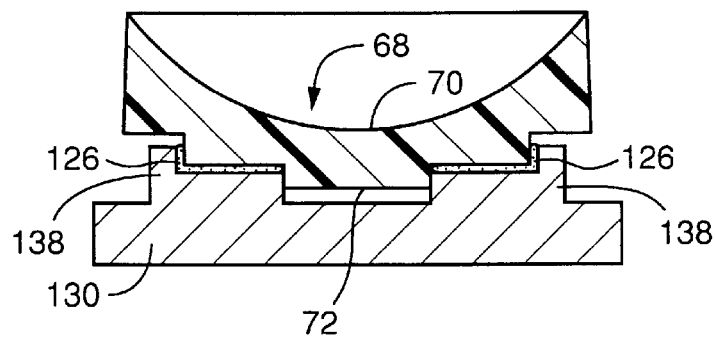
FIG. 12 is an elevational view in cross section of a lens blank formed with the lower mold of FIG. 9, when the lens blank is held by a suitable holding jig in the form of a disk frame.
Figure 13:
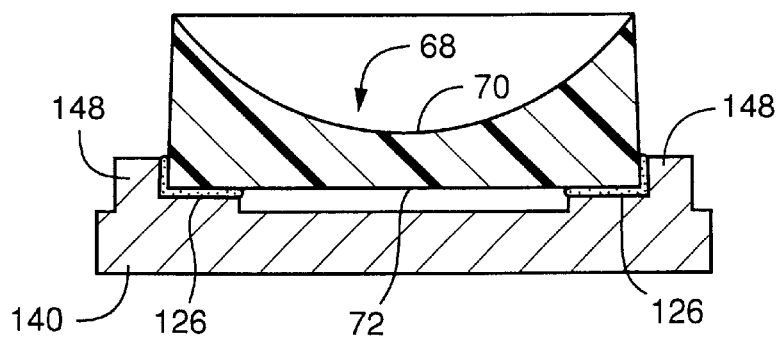
FIG. 13 is an elevational view in cross section of a lens blank formed with the lower mold of FIG. 10, when the lens blank is held by a suitable holding jig in the form of a disk frame.

FIGS. 11–13 show specific examples where the lens blanks formed with the respective lower molds 16 shown in FIGS. 8–10 are advantageously held by respective metallic disk frames (disk face plates) 120, 130, 140 as suitable holding jigs, with a bonding adhesive applied to the curved, convex or flat outer surface of each lens blank.

The lens blank 68 formed with the lower mold 16 of FIG. 8 can be held by the metallic disk frame 120 having a central protruding portion 122 and an annular protruding portion 124 each of which axially projects from a main body of the disk frame 120, as shown in FIG. 11. The annular protruding portion 124 circumferentially extends around the central protruding portion 122 and is spaced apart from the central protruding portion 122 by a predetermined radial distance. The central protruding portion 122 and the annular protruding portion 124 have end faces, which are inwardly curved following the curved outer surface 72 of the lens blank 68. The lens blank 68 is fixed at the curved outer surface 72 to the end faces of the central and annular protruding portions 122, 124 of the disk frame 120, with a known bonding adhesive 126 applied to the end faces of the protruding portions 122, 124 or the corresponding portions of the curved outer surface 72.

The lens blank 68 formed with the lower mold 16 of FIG. 9 can be held by the metallic disk frame 130 having an annular protruding portion 138 which axially projects from a main body of the disk frame 130 and circumferentially extends, as shown in FIG. 12. The lens blank 68 is fitted at the stepped portion of the convex outer surface 72 in an annular inner stepped surface of the annular protruding portion 138. The lens blank 68 is then fixed to the disk frame 130, with a known bonding adhesive 126 applied to the annular inner stepped surface of the annular protruding portion 138 or the stepped portion of the convex outer surface 72.

The lens blank 68 formed with the lower mold 16 of FIG. 10 can be held by the metallic disk frame 140 having an annular protruding portion 148 which axially projects from a main body of the disk frame 140 and circumferentially extends, as shown in FIG. 13. The lens blank 68 is fitted at an outer peripheral edge portion of the flat outer surface 72 in an annular inner stepped surface of the annular protruding portion 148. The lens blank 68 is then fixed to the disk frame 140, with a known bonding adhesive 126 applied to the annular inner stepped surface of the annular protruding portion 148 or the outer peripheral edge portion of the flat outer surface 72.

The lens blank 68, which has been thus fixed to the metallic disk frame 120, 130 or 140, is then subjected to a cutting operation on its inner surface 70 in a conventional manner, so as to give a back surface of an ophthalmic lens. In general, where the lens blank is held in a clamping manner by a conventional holding jig or fixture such as a chuck with jaws, the lens blank is likely to be undesirably deformed due to a clamping force applied thereto. However, in any one of the above-described specific examples, in which the lens blank is fixed to the disk frame as the holding jig with a bonding adhesive, the lens blank no longer suffers from such a conventionally experienced problem. That is, the mold assembly according to the present invention provides the lens blank which is capable of being held by a suitable holding jig with a bonding adhesive as well as a vacuum source, without a risk of an undesirable deformation of the lens blank. In other words, the mold assembly of the present invention advantageously makes it possible to manufacture a desired ophthalmic lens at a reduced cost with conventional manufacturing equipment or minimum modification thereto, without necessity of new investment in equipment.

In the illustrated mold assemblies 10, 102, a major portion of the upper cavity-defining surface 21 is provided by the downwardly convex part-spherical bottom portion 20 of the upper mold 12. The upper cavity-defining surface 21 provides the inner surface 70 of the lens blank 68, which is cut to provide the back surface of the desired ophthalmic lens (contact lens) to be manufactured. However, the lower cavity-defining surface 21 may be formed to have a profile that gives the lens blank an inner surface 70 which provides the back surface of the ophthalmic lens, without a cutting operation on the inner surface 70. In this case, too, the lens blank can be efficiently cut into the desired ophthalmic lens, with a simple cutting operation.

Where the upper and lower cavity-defining surfaces of the upper and lower molds 12, 16 have respective profiles following those of the back and front surfaces of the desired ophthalmic lens to be manufactured, those cavity defining surfaces are desirably mirror-finished, and the axial distance between these cavity-defining surfaces must be set so that the formed ophthalmic lens has a desired thickness.

In the specific example of FIG. 6, the blank holding jig 78 is used to hold the lens blank 68 when the inner surface 70 of the lens blank 68 is cut to produce the intermediate product 90 having the inner surface 88. As described above, the blank holding jig 78 is a generally cylindrical hollow structure having the air suction hole 80 and the annular tapered bearing surface 76 at one of its axial ends, so that the lens blank 68 is held at its outer surface 72 in pressing contact with the annular tapered bearing surface 76 under a reduced pressure applied through the air suction hole 80. However, the lens blank 68 may be held by a blank holding jig which is a generally cylindrical solid structure having, at one of its opposite ends, an end face consisting of an outer annular tapered surface and a central flat surface. The outer annular tapered surface corresponds to the outer annular tapered portion of the outer surface 72 of the lens blank 68, while the central flat surface corresponds to the central flat portion of the outer surface 72. The generally cylindrical solid structure of the blank holding jig has at least one air suction hole which is open in the central flat surface. The lens blank 68 is held on the end face of the jig such that the outer surface 72 is in contact with the end face, with a reduced pressure being applied to the central flat portion of the outer surface 72 of the lens blank 68 through the air suction hole or holes. In other words, the air suction hole 80 of the blank holding jig 68 may be replaced by at least one suction hole each having a considerably small diameter.

Where the lens blank 68 is formed in a mold cavity 60 which is partially defined by the upper part-spherical cavity-defining surface 21 of the upper mold 12 shown in FIGS. 1 and 7 and the lower part-spherical cavity-defining surface 54 shown in FIG. 8, that is, where the lens blank 68 formed has the inner and outer surfaces which gives the back and front surfaces of the desired ophthalmic lens, the lens blank 68 is subjected to a cutting operation on only its edge portion and circumferential surface portions, to eventually manufacture the desired ophthalmic lens such as a contact lens having the nominal configuration.

In this instance, the lens blank 68 may be held on a spindle of a lathe or other machine tool, through a known vacuum-suction holding jig which employs a reduced pressure supplied from a suitable vacuum source so as to hold the lens blank 68 thereon in the same manner as described above with respect to the cutting operation on the inner surface 70 of the lens blank 68 formed by the mold assembly 10 of the first embodiment, as shown in FIG. 6. Alternatively, the lens blank 68 may be held through a suitable holder jig with a bonding adhesive applied to the lens blank 68, as described above with respect to the cutting operation on the outer surface 72 of the lens blank 68 formed by the mold assembly 10 of the first embodiment.

While the mold assemblies according to the illustrated embodiments are designed for forming a lens blank for a contact lens, the principle of the present invention is equally applicable to a mold assembly for forming a lens blank for other ophthalmic lenses such as an intraocular lens.

While the presently preferred embodiments of the invention have been described above in detail by reference to the accompanying drawings, it is to be understood that the present invention may be embodied with various changes, modifications and improvements, which may occur to those skilled in the art, in the light of the foregoing teachings, without departing from the spirit and scope of the invention defined in the following claims.

What is claimed is:

1. A mold assembly having a mold cavity to be filled with a liquid monomer composition which is polymerized to form a lens blank for use in manufacturing a desired ophthalmic lens, comprising:

an upper mold including a substantially cylindrical body portion, an outward flange portion extending radially outwardly from one of axially opposite ends of said body portion, and an annular engaging portion which extends from said outward flange portion in an axial direction thereof from said one of said axially opposite ends of said body portion toward the other of said axially opposite ends, said annular engaging portion having an outer surface;

a lower mold having a tapered outer surface; and an intermediate sleeve for removably connecting said upper and lower molds, said intermediate sleeve including a lower portion, an upper portion and an intermediate portion located between said lower and upper portions, said lower portion having a lower tapered inner surface for press-fitting engagement with said tapered outer surface of said lower mold, to effect fluid-tight connection of said lower mold and said intermediate sleeve, said upper portion of said intermediate sleeve having an upper tapered inner surface whose diameter is larger than an inside diameter of an inner surface of said intermediate portion, said intermediate sleeve further including a shoulder between said upper tapered inner surface of said upper portion and said inner surface of said intermediate portion, said outer surface of said annular engaging portion of said upper mold being provided for press-fitting engagement with said tipper tapered inner surface of said intermediate sleeve, to effect fluid-tight connection of said upper mold and said intermediate sleeve, with said body portion of said upper mold being held in abutting contact with said shoulder in an axial direction of said intermediate sleeve, such that said upper mold and said intermediate sleeve cooperate with said lower mold to define said mold cavity, with said tapered outer surface of said lower mold being held in press-fitting engagement with said lower tapered inner surface of said intermediate sleeve, said press-fitting engagement of said outer surface of said annular engaging portion of said tipper mold with said upper tapered inner surface of said intermediate sleeve cooperating with said abutting contact of said body portion with said shoulder, to define a liquid reservoir for storing an excess amount of said liquid monomer composition which has been discharged from said mold cavity when said mold cavity is defined by fluid-tight connection of said upper and lower molds to said intermediate sleeve, said annular engaging portion having an inside diameter larger than an outside diameter of said cylindrical portion, for thereby cooperating with said cylindrical portion to define an annular reservoir which has a predetermined radial dimension and which provides at least a part of said liquid reservoir, said intermediate sleeve and said lower mold cooperating to provide a stopper for determining a relative axial position therebetween.

2. A mold assembly according to claim 1, wherein said outer surface of said annular engaging portion of said upper mold is a tapered outer surface whose diameter decreases in the axial direction from said one of said axially opposite ends of said body portion toward said other of said axially opposite ends.

3. A mold assembly according to claim 1, wherein said outer surface of said annular engaging portion of said upper mold is a radially inwardly curved surface whose diameter decreases in the axial direction from said one of said axially opposite ends of said body portion toward said other of said axially opposite ends.

4. A mold assembly according to claim 1, wherein said lower mold includes a lower cavity-defining portion having a lower cavity-defining surface which partially defines said mold cavity and which is at least partially constituted by a tapered surface whose diameter increases in an axial direction from said lower mold toward said upper mold, said lower cavity-defining surface giving said lens blank a convex outer surface including a tapered portion corresponding to said tapered surface.

5. A mold assembly according to claim 4, wherein said lower cavity-defining surface of said lower mold consists of a central flat surface extending in a radial direction of said intermediate sleeve, and an annular tapered surface which is formed as said tapered surface so as to extend radially outwardly from a periphery of said central flat surface, so that said convex outer surface of said lens blank consists of a central flat portion and an annular tapered portion extending radially outwardly from a periphery of said central flat portion.

6. A mold assembly according to claim 4, wherein said tapered surface of said lower cavity-defining surface is inclined by an angle of not larger than 45° with respect to a plane perpendicular to an axis of said intermediate sleeve.

7. A mold assembly according to claim 6, wherein said angle is within a range of 10–35°.

8. A mold assembly according to claim 1, wherein said lower mold includes a lower cavity-defining portion having a lower cavity-defining surface which partially defines said mold cavity and which is at least partially constituted by a curved concave surface whose profile follows a profile of a convex front surface of said ophthalmic lens, said lower cavity-defining surface giving said lens blank an outer surface including a convex portion corresponding to said curved concave surface.

9. A mold assembly according to claim 1, wherein said lower mold includes a lower cavity-defining portion having a lower cavity-defining surface which partially defines said mold cavity, and which has a stepped bore formed therein and a stepped bottom surface, said stepped bore having a plurality of portions having respective different diameters which increase in an axial direction from said lower mold toward said upper mold, said lower cavity-defining surface giving said lens blank a convex outer surface including a stepped portion corresponding to said stepped bottom surface of said stepped bore.

10. A mold assembly according to claim 9, wherein said plurality of portions include a small diameter portion and a large diameter portion which has a substantially coaxial relationship with said small diameter portion and which is located nearer to said upper mold in said axial direction than said small diameter portion, so that said convex outer surface of said lens blank includes a small diameter portion and a large diameter portion.

11. A mold assembly according to claim 1, wherein said lower mold includes a lower cavity-defining portion having a lower cavity-defining surface which partially defines said mold cavity and which consists of a flat surface.

12. A mold assembly according to claim 1, wherein said generally cylindrical body portion of said upper mold includes a curved bottom portion which is convex in the direction from said one of said axially opposite ends of said body portion toward said other of said axially opposite ends and which partially defines said mold cavity, said curved bottom portion having a thickness small enough to be elastically deformable so as to accommodate a change of a volume of said mold cavity.

13. A mold assembly according to claim 12, wherein said thickness of said curved bottom portion is not larger than 2 mm.

14. A mold assembly according to claim 13, wherein said thickness of said curved bottom portion is within a range of 0.5–1.0 mm.

15. A mold assembly according to claim 1, wherein said upper mold has an upper cavity-defining portion having an upper cavity-defining surface which partially defines said mold cavity and which is at least partially constituted by a curved convex surface whose profile follows a profile of a concave back surface of said ophthalmic lens, said upper cavity-defining surface giving said lens blank an inner surface having a concave portion corresponding to said curved convex surface.

16. A mold assembly according to claim 1, wherein said intermediate portion of said intermediate sleeve provides an intermediate cavity-defining portion having an intermediate cavity-defining surface which partially defines said mold cavity and which is at least partially constituted by a tapered inner surface whose diameter increases in the axial direction of the intermediate sleeve from said upper mold toward said lower mold, said intermediate cavity-defining surface giving said lens blank an outer circumferential surface including a tapered portion corresponding to said tapered inner surface so that said lens blank may be held on one of said intermediate sleeve and said lower mold after said upper mold is removed from said intermediate sleeve.

17. A mold assembly according to claim 16, wherein said tapered inner surface of said intermediate cavity-defining surface of said intermediate cavity-defining portion is inclined at an angle of not larger than 10° with respect to an axis of said intermediate sleeve.

18. A mold assembly according to claim 1, wherein a minimum dimension of said mold cavity in the axial direction of said intermediate sleeve is determined such that said lens blank has a minimum thickness of 0.5–2.0 mm.

19. A mold assembly according to claim 1, wherein said ophthalmic lens is a contact lens.

20. A mold assembly according to claim 1, wherein said upper mold, said intermediate sleeve and said lower mold are formed of a synthetic resin material.

21. A mold assembly according to claim 1, wherein said stopper includes a stopper tab extending from a lower end face of said lower portion of said intermediate sleeve in said axial direction, and a shoulder surface which extends in a radial direction of said intermediate sleeve and which is provided at one of axially opposite ends of said tapered outer surface of said lower mold remote from said intermediate sleeve.

* * * * *